US012812449B2

(12) United States Patent
Li et al.

(10) Patent No.: US 12,812,449 B2
(45) Date of Patent: Nov. 24, 2026

(54) DATA TRANSMISSION METHOD, LINK QUALITY DETECTION METHOD, COMMUNICATION APPARATUS, AND STORAGE MEDIUM

(71) Applicant: Huawei Technologies Co., Ltd., Shenzhen (CN)

(72) Inventors: Hancheng Li, Shanghai (CN); Weihua Hu, Shenzhen (CN); Wenfu Wu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 683 days.

(21) Appl. No.: 18/184,724

(22) Filed: Mar. 16, 2023

(65) Prior Publication Data

US 2023/0217300 A1 Jul. 6, 2023

Related U.S. Application Data

(63) Continuation of application No. PCT/CN2021/116732, filed on Sep. 6, 2021.

(30) Foreign Application Priority Data

Sep. 17, 2020 (CN) ......................... 202010981900.4

(51) Int. Cl.
*H04W 28/02* (2009.01)
*H04W 72/542* (2023.01)

(52) U.S. Cl.
CPC ..... *H04W 28/0268* (2013.01); *H04W 72/542* (2023.01)

(58) Field of Classification Search
CPC ........... H04W 28/0268; H04W 72/542; H04W 28/24; H04W 24/08; H04B 17/309
See application file for complete search history.

(56) References Cited

FOREIGN PATENT DOCUMENTS

| | | | | | |
|---|---|---|---|---|---|
| CN | 105872958 | A | | 8/2016 | |
| CN | 110809295 | A | * | 2/2020 | ............ H04W 28/24 |
| JP | 2021532641 | A | | 11/2021 | |
| WO | WO-2020146991 | A1 | * | 7/2020 | ............. H04L 45/38 |
| WO | WO-2020148062 | A1 | * | 7/2020 | ............. H04L 69/22 |

* cited by examiner

*Primary Examiner* — Ayanah S George
(74) *Attorney, Agent, or Firm* — Slater Matsil, LLP

(57) ABSTRACT

This application discloses a data transmission method, a link quality detection method, a communication apparatus, and a storage medium, and relates to the communication field. The data transmission method includes: A first user plane function receives data from a first terminal, where the data is data sent to a second terminal; and the first user plane function sends the data to a second user plane function through a first QoS flow, where the second user plane function is a user plane function corresponding to the second terminal. In the data transmission method, data transmission is performed between the first user plane function and the second user plane function through the first QoS flow, and data transmission can also be performed between the first terminal and the first user plane function and between the second terminal and the second user plane function based on a QoS flow.

20 Claims, 12 Drawing Sheets

DATA TRANSMISSION METHOD, LINK QUALITY DETECTION METHOD, COMMUNICATION APPARATUS, AND STORAGE MEDIUM

CROSS-REFERENCE TO RELATED APPLICATIONS

This application is a continuation of International Application No. PCT/CN2021/116732, filed on Sep. 6, 2021, which claims priority to Chinese Patent Application No. 202010981900.4, filed on Sep. 17, 2020. The disclosures of the aforementioned applications are hereby incorporated by reference in their entireties.

TECHNICAL FIELD

Embodiments of this application relate to the communication field, and in particular, to a data transmission method, a link quality detection method, a communication apparatus, and a storage medium.

BACKGROUND

A fifth generation (5G) mobile communication network may provide end-to-end service data transmission between two terminals. For example, a terminal 1 may send service data to a terminal 2 by using a 5G network.

In a possible scenario in which end-to-end service data transmission is implemented by using a 5G network, the two terminals share a same user plane network element (user plane function (UPF)), and service data between the two terminals is forwarded by using the shared UPF. For example, when the terminal 1 and the terminal 2 share a same UPF, the terminal 1 may first send service data to the UPF, and the UPF may forward the received service data to the terminal 2, to implement transmission of the service data from the terminal 1 to the terminal 2. In another possible scenario in which end-to-end service data transmission is implemented by using a 5G network, the two terminals are respectively connected to different UPFs, and service data between the two terminals is forwarded by using UPFs respectively connected to the two terminals. For example, when the terminal 1 is connected to a UPF1, and the terminal 2 is connected to a UPF2, the terminal 1 may first send service data to the UPF1, the UPF1 may forward the received service data to the UPF2, and the UPF2 may then forward the received service data to the terminal 2, to implement transmission of the service data from the terminal 1 to the terminal 2.

In the 5G network, data transmission is performed between a terminal and a UPF based on a quality of service (QoS) flow. Therefore, in the foregoing scenario in which two terminals share a same UPF, the 5G network can provide end-to-end QoS guarantee for service data transmission between the two terminals. However, in the foregoing scenario in which the two terminals are respectively connected to different UPFs, the 5G network can only provide QoS guarantee for service data transmission between each terminal and a UPF corresponding to the terminal, but cannot provide overall end-to-end QoS guarantee between the two terminals.

SUMMARY

Embodiments of this application provide a data transmission method, a link quality detection method, a communication apparatus, and a storage medium, to provide overall end-to-end QoS guarantee between two terminals.

According to a first aspect, an embodiment of this application provides a data transmission method. The method includes: A first user plane function receives data from a first terminal, where the data is data sent to a second terminal. The first user plane function sends the data to a second user plane function through a first quality of service flow, where the second user plane function is a user plane function corresponding to the second terminal.

In the method, data is transmitted between the first user plane function and the second user plane function through the first quality of service flow, and data can also be transmitted between the first terminal and the first user plane function and between the second terminal and the second user plane function based on a quality of service flow. Therefore, reliable quality of service guarantee can be provided for data sent by the first terminal to the second terminal in an entire transmission path from the first terminal to the second terminal.

In a possible design, the data includes a link detection indication, and the method further includes: The first user plane function inserts link quality information of a transmission path from the first terminal to the first user plane function or link quality information of a transmission path from an access network device of the first terminal to the first user plane function into the data based on the link detection indication.

For example, when the first terminal directly accesses a core network, the first user plane function inserts the link quality information of the transmission path from the first terminal to the first user plane function into the data. When the first terminal accesses the core network by using the access network device, the first user plane function inserts the link quality information of the transmission path from the access network device of the first terminal to the first user plane function into the data.

Optionally, any device in the transmission path from the first terminal to the second terminal, for example, the access network device of the first terminal, the first user plane function, the second user plane function, and an access network device of the second terminal, may insert link quality information of a transmission path from a previous transmission device to the device into the data based on the link detection indication. For example, for the second user plane function, the previous transmission device is the first user plane function.

In this design, the first terminal may finally obtain the link quality information of the entire transmission path from the first terminal to the second terminal, to subsequently select an appropriate transmission path based on the link quality information of the entire transmission path from the first terminal to the second terminal to send the data to the second terminal. The second terminal may finally obtain link quality information of an entire transmission path from the second terminal to the first terminal, to subsequently select an appropriate transmission path based on the link quality information of the entire transmission path from the second terminal to the first terminal to send the data to the first terminal.

In a possible design, the method further includes: The first user plane function sends a first link detection request to the first terminal. The first user plane function receives, from the first terminal, link quality information of a transmission path from the first user plane function to the first terminal.

In this design, the first user plane function may obtain the link quality information of the transmission path from the first user plane function to the first terminal on the side of the first terminal.

Similarly, the second user plane function may also send a link detection request to the second terminal, to obtain link quality information of a transmission path from the second user plane function to the second terminal on the side of the second terminal.

In a possible design, the method further includes: The first user plane function receives a second link detection request from the second user plane function. The first user plane function sends, to the second user plane function, the link quality information of the transmission path from the first user plane function to the first terminal and link quality information of a transmission path from the second user plane function to the first user plane function.

In this design, the second user plane function may obtain link quality information of a transmission path from the first user plane function to the first terminal and the link quality information of the transmission path from the second user plane function to the first user plane function.

Similarly, the first user plane function may alternatively send a link detection request to the second user plane function, to obtain the link quality information of the transmission path from the second user plane function to the second terminal and link quality information of a transmission path from the first user plane function to the second user plane function.

For example, in a possible design, the method further includes: The first user plane function sends a third link detection request to the second user plane function. The first user plane function receives, from the second user plane function, the link quality information of the transmission path from the first user plane function to the second user plane function and the link quality information of the transmission path from the second user plane function to the second terminal.

The first user plane function can obtain the link quality information of the transmission path from the first terminal to the first user plane function. Therefore, the first user plane function may send, to the first terminal, the link quality information of the transmission path from the first terminal to the first user plane function, the link quality information of the transmission path from the first user plane function to the second user plane function, and the link quality information of the transmission path from the second user plane function to the second terminal.

In this design, the first terminal may finally obtain the link quality information of the entire transmission path from the first terminal to the second terminal, to subsequently select an appropriate transmission path based on the link quality information of the entire transmission path from the first terminal to the second terminal to send the data to the second terminal.

Similarly, the second user plane function can obtain link quality information of a transmission path from the second terminal to the second user plane function. As described above, the second terminal may also obtain the link quality information of the transmission path from the first user plane function to the first terminal and the link quality information of the transmission path from the second user plane function to the first user plane function. Therefore, the second user plane function may send the link quality information of the transmission path from the second terminal to the second user plane function to the second terminal, the link quality information of the transmission path from the second user plane function to the first user plane function, and the link quality information of the transmission path from the first user plane function to the first terminal.

In this case, the second terminal may finally obtain link quality information of an entire transmission path from the second terminal to the first terminal, to subsequently select an appropriate transmission path based on the link quality information of the entire transmission path from the second terminal to the first terminal to send the data to the first terminal.

In a possible design, the link quality information of the transmission path from the first user plane function to the second user plane function includes a timestamp at which the second user plane function receives the third link detection request and a timestamp at which the second user plane function sends the link quality information. The method further includes: The first user plane function determines link quality of the transmission path from the first user plane function to the second user plane function based on the link quality information of the transmission path from the first user plane function to the second user plane function.

In a possible design, that a first user plane function receives data from a first terminal includes: The first user plane function receives the data from the first terminal through a second quality of service flow. The method includes: The first user plane function determines, based on a correspondence between the second quality of service flow and the first quality of service flow, the first quality of service flow corresponding to the second quality of service flow.

The correspondence between the second quality of service flow and the first quality of service flow is determined based on a QoS requirement (or referred to as a QoS capability) that can be satisfied by the second quality of service flow and a QoS requirement that can be satisfied by the first quality of service flow.

In a possible design, the method further includes: The first user plane function receives first configuration information from a first session management function, where the first configuration information is for indicating the correspondence between the second quality of service flow and the first quality of service flow.

In this design, the correspondence between the second quality of service flow and the first quality of service flow may be configured by a session management function corresponding to the first user plane function for the first user plane function.

In a possible design, the first configuration information includes identifier information of the second quality of service flow and identifier information of the first quality of service flow corresponding to the second quality of service flow.

For example, the identifier information of the second quality of service flow and the identifier information of the first quality of service flow corresponding to the second quality of service flow may be QFIs.

In a possible design, the first configuration information further includes identifier information of a first interface, the first interface is an interface between the first user plane function and the second user plane function, and the first configuration information is for indicating the first user plane function to send the data to the second user plane function on the first interface through the first quality of service flow.

In a possible design, the identifier information of the second quality of service flow is the same as that of the first quality of service flow.

In a possible design, that a first user plane function receives data from a first terminal includes: The first user plane function receives the data from the first terminal through a second quality of service flow. The method includes: The first user plane function determines, based on a correspondence between the second quality of service flow and the first interface, the first interface corresponding to the second quality of service flow, and determining the first quality of service flow corresponding to the first interface, where the first interface is the interface between the first user plane function and the second user plane function.

The correspondence between the second quality of service flow and the first interface is determined based on a QoS requirement that can be satisfied by the second quality of service flow and a QoS requirement that can be satisfied by the first interface.

In a possible design, the method further includes: The first user plane function receives first configuration information from the first session management function, where the first configuration information is for indicating the correspondence between the second quality of service flow and the first interface.

In this design, the correspondence between the second quality of service flow and the first quality of service flow may also be configured by a session management function corresponding to the first user plane function for the first user plane function.

In a possible design, the first configuration information includes identifier information of the second quality of service flow and identifier information of the first interface corresponding to the second quality of service flow.

In still another possible design, the method further includes: The first user plane function determines, based on a correspondence between a data feature of the data and the first quality of service flow, the first quality of service flow corresponding to the data feature.

In a possible design, the first user plane function receives the first configuration information from the first session management function, where the first configuration information is for indicating the correspondence between the data feature and the first quality of service flow.

In a possible design, the first configuration information includes the data feature and identifier information of the first quality of service flow corresponding to the data feature.

In a possible design, the first configuration information further includes identifier information of a first interface, the first interface is an interface between the first user plane function and the second user plane function, and the first configuration information is for indicating the first user plane function to send the data to the second user plane function on the first interface through the first quality of service flow.

In still another possible design, the method further includes: The first user plane function determines, based on a correspondence between the data feature and the first interface, the first interface corresponding to the data feature of the data, and determines the first quality of service flow corresponding to the first interface, where the first interface is an interface between the first user plane function and the second user plane function.

In a possible design, the method further includes: The first user plane function receives first configuration information from the first session management function, where the first configuration information is for indicating the correspondence between the data feature and the first interface.

In a possible design, the first configuration information includes the data feature and identifier information of the first interface corresponding to the data feature.

In a possible design, the data includes a user tunnel identifier, and the user tunnel identifier is for indicating that the data is the data sent by the first terminal to the second terminal.

In this design, the user tunnel identifier is added to the data sent by the first terminal to the second terminal, so that the first UPF can determine, based on the user tunnel identifier in the received data, an end-to-end forwarding service, and distinguish the end-to-end forwarding service from an 5G LAN service. A packet of the 5G LAN service is forwarded based on a destination address in the packet. However, in embodiments of this application, an end-to-end service is forwarded based on a flow, and the UPF is unaware of the destination address in the packet.

According to a second aspect, an embodiment of this application provides a communication apparatus. The apparatus has a function of implementing the foregoing method in the first aspect. The function may be implemented by hardware, or may be implemented by executing corresponding software by hardware. The hardware or the software includes one or more units or modules corresponding to the function of the method according to the first aspect, for example, a receiving unit and a sending unit.

The receiving unit is configured to receive data from a first terminal, where the data is data sent to a second terminal. The sending unit is configured to send the data to a second user plane function through a first quality of service flow, where the second user plane function is a user plane function corresponding to the second terminal.

In a possible design, the data includes a link detection indication, and the sending unit is further configured to insert link quality information of a transmission path from the first terminal to the first user plane function or link quality information of a transmission path from an access network device of the first terminal to the first user plane function into the data based on the link detection indication.

In a possible design, the sending unit is further configured to send a first link detection request to the first terminal; and the receiving unit is further configured to receive, from the first terminal, link quality information of a transmission path from the first user plane function to the first terminal.

In a possible design, the receiving unit is further configured to receive a second link detection request from the second user plane function; and the sending unit is further configured to send, to the second user plane function, the link quality information of the transmission path from the first user plane function to the first terminal and link quality information of a transmission path from the second user plane function to the first user plane function.

In a possible design, the sending unit is further configured to send a third link detection request to the second user plane function; the receiving unit is further configured to receive, from the second user plane function, link quality information of a transmission path from the first user plane function to the second user plane function and link quality information of a transmission path from the second user plane function to the second terminal; and the sending unit is further configured to send, to the first terminal, link quality information of a transmission path from the first terminal to the first user plane function, the link quality information of the transmission path from the first user plane function to the second user plane function, and the link quality information of the transmission path from the second user plane function to the second terminal.

In a possible design, the link quality information of the transmission path from the first user plane function to the second user plane function includes a timestamp at which the second user plane function receives the third link detection request and a timestamp at which the second user plane function sends the link quality information. The apparatus further includes: a processing unit, configured to determine link quality of the transmission path from the first user plane function to the second user plane function based on the link quality information of the transmission path from the first user plane function to the second user plane function.

In a possible design, the receiving unit is specifically configured to receive the data from the first terminal through a second quality of service flow; and the apparatus further includes: the processing unit, configured to determine, based on a correspondence between the second quality of service flow and the first quality of service flow, the first quality of service flow corresponding to the second quality of service flow.

In a possible design, the receiving unit is further configured to receive first configuration information from a first session management function, where the first configuration information is for indicating the correspondence between the second quality of service flow and the first quality of service flow.

In a possible design, the first configuration information includes identifier information of the second quality of service flow and identifier information of the first quality of service flow corresponding to the second quality of service flow.

In a possible design, the first configuration information further includes identifier information of a first interface, and the first configuration information is for indicating the sending unit to send the data to the second user plane function on the first interface through the first quality of service flow.

In a possible design, the identifier information of the second quality of service flow is the same as that of the first quality of service flow.

In another possible design, the receiving unit is specifically configured to receive the data from the first terminal through a second quality of service flow; and the apparatus further includes: the processing unit, configured to: determine, based on a correspondence between the second quality of service flow and the first interface, the first interface corresponding to the second quality of service flow, and determine the first quality of service flow corresponding to the first interface.

In a possible design, the receiving unit is further configured to receive first configuration information from a first session management function, where the first configuration information is for indicating the correspondence between the second quality of service flow and the first interface.

In a possible design, the first configuration information includes identifier information of the second quality of service flow and identifier information of the first interface corresponding to the second quality of service flow.

In still another possible design, the apparatus further includes: the processing unit, configured to determine, based on a correspondence between a data feature and the first quality of service flow, the first quality of service flow corresponding to the data feature.

In a possible design, the receiving unit is further configured to receive first configuration information from a first session management function, where the first configuration information is for indicating the correspondence between the data feature and the first quality of service flow.

In a possible design, the first configuration information includes the data feature and identifier information of the first quality of service flow corresponding to the data feature.

In a possible design, the first configuration information further includes identifier information of the first interface, and the first configuration information is for indicating the sending unit to send the data to the second user plane function on the first interface through the first quality of service flow.

In still another possible design, the apparatus further includes: the processing unit, configured to: determine, based on a correspondence between the data feature and the first interface, the first interface corresponding to the data feature of the data, and determine the first quality of service flow corresponding to the first interface.

In a possible design, the receiving unit is further configured to receive first configuration information from a first session management function, where the first configuration information is for indicating the correspondence between the data feature and the first interface.

In a possible design, the first configuration information includes the data feature and identifier information of the first interface corresponding to the data feature.

In a possible design, the data includes a user tunnel identifier, and the user tunnel identifier is for indicating that the data is data sent by the first terminal to the second terminal.

According to a third aspect, an embodiment of this application further provides a communication apparatus. The communication apparatus includes: a processor, configured to execute computer instructions stored in a memory. When the computer instructions are executed, the apparatus is enabled to perform the method according to any one of the first aspect or the possible designs of the first aspect.

According to a fourth aspect, an embodiment of this application further provides a communication apparatus, including a processor and an interface circuit. The processor is configured to: communicate with another apparatus by using the interface circuit, and perform the method according to any one of the first aspect or the possible designs of the first aspect.

The communication apparatus according to the second aspect to the fourth aspect may be applied to a first user plane function.

According to a fifth aspect, an embodiment of this application further provides a computer-readable storage medium, including computer software instructions. When the computer software instructions are run on an electronic device such as a core network device or a chip built in the core network device, the core network device is enabled to perform the method according to any one of the first aspect or the possible designs of the first aspect.

It may be understood that, for beneficial effects that can be achieved in the second aspect to the tenth aspect, refer to beneficial effects in any one of the first aspect and the possible designs of the first aspect. Details are not described herein again.

According to a sixth aspect, an embodiment of this application provides a data transmission method. The method includes: A second user plane function receives data from a first user plane function through a first quality of service flow, where the first user plane function is a user plane function corresponding to a first terminal, and the data is data sent to a second terminal. The second user plane function sends the data to the second terminal.

In the method, data is transmitted between the first user plane function and the second user plane function through the first quality of service flow, and data can also be transmitted between the first terminal and the first user plane function and between the second terminal and the second user plane function based on a quality of service flow. Therefore, reliable quality of service guarantee can be provided for data sent by the first terminal to the second terminal in an entire transmission path from the first terminal to the second terminal.

In a possible design, the data includes a link detection indication, and the method further includes: The second user plane function inserts link quality information of a transmission path from the first user plane function to the second user plane function into the data based on the link detection indication.

In a possible design, the method further includes: The second user plane function sends a second link detection request to the first user plane function. The second user plane function receives link quality information of a transmission path from the first user plane function to the first terminal and link quality information of a transmission path from the second user plane function to the first user plane function from the first user plane function. The second user plane function sends the link quality information of the transmission path from the first user plane function to the first terminal to the second terminal, the link quality information of the transmission path from the second user plane function to the first user plane function, and link quality information of a transmission path from the second terminal to the second user plane function.

In a possible design, the method further includes: The second user plane function receives a third link detection request from the first user plane function. The second user plane function sends the link quality information of the transmission path from the first user plane function to the second user plane function and link quality information of a transmission path from the second user plane function to the second terminal to the first user plane function.

In a possible design, the method further includes: The second user plane function sends a fourth link detection request to the second terminal. The second user plane function receives the link quality information of the transmission path from the second user plane function to the second terminal from the second terminal.

In a possible design, the method further includes: The second user plane function sends a link detection request to the first user plane function. The second user plane function receives link quality information from the first user plane function, where the link quality information includes a timestamp at which the first user plane function receives the link detection request and a timestamp at which the first user plane function sends the link quality information. The second user plane function determines link quality of the transmission path from the second user plane function to the first user plane function based on the link quality information.

In a possible design, that the second user plane function sends the data to the second terminal includes: The second user plane function sends the data to the second terminal through a third quality of service flow. The method further includes: The second user plane function determines, based on a correspondence between the first quality of service flow and the third quality of service flow, the third quality of service flow corresponding to the first quality of service flow.

The correspondence between the first quality of service flow and the third quality of service flow is determined based on a QoS requirement that can be satisfied by the first quality of service flow and a QoS requirement that can be satisfied by the third quality of service flow.

In a possible design, the method further includes: The second user plane function receives second configuration information from a second session management function, where the second configuration information is for indicating the correspondence between the first quality of service flow and the third quality of service flow.

In this design, the correspondence between the first quality of service flow and the third quality of service flow may be configured by a session management function corresponding to the second user plane function for the second user plane function.

In a possible design, the second configuration information includes identifier information of the first quality of service flow and identifier information of the third quality of service flow corresponding to the first quality of service flow.

In a possible design, the identifier information of the first quality of service flow is the same as the identifier information of the third quality of service flow.

In another possible design, that a second user plane function receives data from a first user plane function through a first quality of service flow includes: The second user plane function receives, on a first interface, the data from the first user plane function through the first quality of service flow. That the second user plane function sends the data to the second terminal includes: The second user plane function sends the data to the second terminal through the third quality of service flow. The method further includes: The second user plane function determines, based on a correspondence between the first interface and the third quality of service flow, the third quality of service flow corresponding to the first interface.

The correspondence between the first interface and the third quality of service flow is determined based on a QoS requirement that can be satisfied by the first interface and the QoS requirement that can be satisfied by the third quality of service flow.

In a possible design, the method further includes: The second user plane function receives second configuration information from the second session management function, where the second configuration information is for indicating the correspondence between the first interface and the third quality of service flow.

In a possible design, the second configuration information includes identifier information of the first interface and the identifier information of the third quality of service flow corresponding to the first interface.

In a possible design, the data includes a user tunnel identifier, and the user tunnel identifier is for indicating that the data is the data sent by the first terminal to the second terminal.

In the sixth aspect, beneficial effects of some design manners are the same as or similar to those in the first aspect. Details are not described again.

According to a seventh aspect, an embodiment of this application provides a communication apparatus. The apparatus has a function of implementing the foregoing method in the sixth aspect. The function may be implemented by hardware, or may be implemented by executing corresponding software by hardware. The hardware or the software includes one or more units or modules corresponding to the function of the method according to the sixth aspect, for example, a receiving unit and a sending unit.

The receiving unit is configured to receive data from a first user plane function through a first quality of service flow, where the first user plane function is a user plane function corresponding to a first terminal, and the data is data sent to a second terminal. The sending unit is configured to send the data to the second terminal.

In a possible design, the data includes a link detection indication, and the sending unit is further configured to insert link quality information of a transmission path from the first user plane function to a second user plane function into the data based on the link detection indication.

In a possible design, the sending unit is further configured to send a second link detection request to the first user plane function; the receiving unit is further configured to receive link quality information of a transmission path from the first user plane function to the first terminal and link quality information of a transmission path from the second user plane function to the first user plane function from the first user plane function; and the sending unit is further configured to send the link quality information of the transmission path from the first user plane function to the first terminal to the second terminal, the link quality information of the transmission path from the second user plane function to the first user plane function, and link quality information of a transmission path from the second terminal to the second user plane function.

In a possible design, the receiving unit is further configured to receive a third link detection request from the first user plane function; and the sending unit is further configured to send the link quality information of the transmission path from the first user plane function to the second user plane function and link quality information of a transmission path from the second user plane function to the second terminal to the first user plane function.

In a possible design, the sending unit is further configured to send a fourth link detection request to the second terminal; and the receiving unit is further configured to receive the link quality information of the transmission path from the second user plane function to the second terminal from the second terminal.

In a possible design, the sending unit is further configured to send a link detection request to the first user plane function; the receiving unit is further configured to receive link quality information from the first user plane function, where the link quality information includes a timestamp at which the first user plane function receives the link detection request and a timestamp at which the first user plane function sends the link quality information; and the apparatus further includes a processing unit, configured to determine link quality of the transmission path from the second user plane function to the first user plane function based on the link quality information.

In a possible design, the sending unit is specifically configured to send the data to the second terminal through a third quality of service flow; and the apparatus further includes a processing unit, configured to determine, based on a correspondence between the first quality of service flow and the third quality of service flow, the third quality of service flow corresponding to the first quality of service flow.

In a possible design, the receiving unit is further configured to receive second configuration information from a second session management function, where the second configuration information is for indicating the correspondence between the first quality of service flow and the third quality of service flow.

In a possible design, the second configuration information includes identifier information of the first quality of service flow and identifier information of the third quality of service flow corresponding to the first quality of service flow.

In a possible design, the identifier information of the first quality of service flow is the same as the identifier information of the third quality of service flow.

In another possible design, the receiving unit is specifically configured to receive the data from the first user plane function on the first interface through the first quality of service flow; the sending unit is specifically configured to send the data to the second terminal through the third quality of service flow; and the apparatus further includes: a processing unit, configured to determine, based on a correspondence between the first interface and the third quality of service flow, the third quality of service flow corresponding to the first interface.

In a possible design, the receiving unit is further configured to receive second configuration information from the second session management function, where the second configuration information is for indicating the correspondence between the first interface and the third quality of service flow.

In a possible design, the second configuration information includes identifier information of the first interface and the identifier information of the third quality of service flow corresponding to the first interface.

In a possible design, the data includes a user tunnel identifier, and the user tunnel identifier is for indicating that the data is data sent by the first terminal to the second terminal.

According to an eighth aspect, an embodiment of this application further provides a communication apparatus. The communication apparatus includes: a processor, configured to execute computer instructions stored in a memory. When the computer instructions are executed, the apparatus is enabled to perform the method according to any one of the sixth aspect or the possible designs of the sixth aspect.

According to a ninth aspect, an embodiment of this application further provides a communication apparatus, including a processor and an interface circuit. The processor is configured to: communicate with another apparatus through the interface circuit, and perform the method according to any one of the sixth aspect or the possible designs of the sixth aspect.

The communication apparatus according to the seventh aspect to the ninth aspect may be applied to a second user plane function.

According to a tenth aspect, an embodiment of this application further provides a computer-readable storage medium, including computer software instructions. When the computer software instructions are run on an electronic device such as a core network device or a chip built in the core network device, the core network device is enabled to perform the method according to any one of the sixth aspect or the possible designs of the sixth aspect.

It may be understood that, for beneficial effects that can be achieved in the seventh aspect to the tenth aspect, refer to beneficial effects in any one of the sixth aspect and the possible designs of the sixth aspect. Details are not described herein again.

According to an eleventh aspect, an embodiment of this application provides a link quality detection method. The method includes: A first terminal sends, to a second terminal, a link detection indication and link quality information of a transmission path from the second terminal to the first terminal. The first terminal receives, from the second terminal, link quality information of a transmission path from the first terminal to the second terminal.

In the method, the first terminal may send the link detection indication to the second terminal, to indicate the second terminal to return the link quality information of the transmission path from the first terminal to the second terminal to the first terminal.

For example, the first terminal may separately send the link detection indication to the second terminal by using a detection packet. For example, the link detection indication may be carried in the detection packet.

In addition, the first terminal may also send, to the second terminal, the link quality information of the transmission path from the second terminal to the first terminal. For example, the second terminal may send the link detection indication to the first terminal. After receiving the link detection indication, the first terminal may send, to the second terminal, the link quality information of the transmission path from the second terminal to the first terminal.

In a possible design, the link quality information of the transmission path from the first terminal to the second terminal includes: link quality information of a transmission path from the first terminal to a first user plane function, link quality information of a transmission path from the first user plane function to a second user plane function, and link quality information of a transmission path from the second user plane function to the second terminal.

In a possible design, the link quality information of the transmission path from the first terminal to the first user plane function includes link quality information of a transmission path from the first terminal to an access network device of the first terminal and link quality information of a transmission path from the access network device of the first terminal to the first user plane function.

In this design, the first terminal accesses a core network by using the access network device of the first terminal.

In a possible design, the link quality information of the transmission path from the second user plane function to the second terminal includes link quality information of a transmission path from the second user plane function to an access network device of the second terminal and link quality information of a transmission path from the access network device of the second terminal to the second terminal.

In this design, the second terminal accesses a core network by using the access network device of the second terminal.

In a possible design, the link detection indication is specifically for indicating to detect link quality information of a quality of service flow that carries the link detection indication and that is in the transmission path from the first terminal to the second terminal.

In another possible design, the link detection indication includes identifier information of one or more quality of service flows.

The identifier information of the one or more quality of service flows includes identifier information of a quality of service flow between the first terminal and the first user plane function, identifier information of a quality of service flow between the first user plane function and the second user plane function, and identifier information of a quality of service flow between the second user plane function and the second terminal.

In a possible design, the method further includes: The first terminal determines, based on the link quality information of the transmission path from the first terminal to the second terminal and a quality of service requirement of data that needs to be sent to the second terminal, a quality of service flow that carries the data.

According to a twelfth aspect, an embodiment of this application provides a communication apparatus. The apparatus has a function of implementing the method according to the eleventh aspect. The function may be implemented by hardware, or may be implemented by executing corresponding software by hardware. The hardware or the software includes one or more units or modules corresponding to the function of the method according to the eleventh aspect, for example, a receiving unit and a sending unit.

The sending unit is configured to send, to a second terminal, a link detection indication and link quality information of a transmission path from the second terminal to a first terminal. The receiving unit is configured to receive, from the second terminal, link quality information of a transmission path from the first terminal to the second terminal.

In a possible design, the link quality information of the transmission path from the first terminal to the second terminal includes: link quality information of a transmission path from the first terminal to a first user plane function, link quality information of a transmission path from the first user plane function to a second user plane function, and link quality information of a transmission path from the second user plane function to the second terminal.

In a possible design, the link quality information of the transmission path from the first terminal to the first user plane function includes link quality information of a transmission path from the first terminal to an access network device of the first terminal and link quality information of a transmission path from the access network device of the first terminal to the first user plane function.

In a possible design, the link quality information of the transmission path from the second user plane function to the second terminal includes link quality information of a transmission path from the second user plane function to an access network device of the second terminal and link quality information of a transmission path from the access network device of the second terminal to the second terminal.

In a possible design, the link detection indication is specifically for indicating to detect link quality information of a quality of service flow that carries the link detection indication and that is in the transmission path from the first terminal to the second terminal.

In another possible design, the link detection indication includes identifier information of one or more quality of service flows.

The identifier information of the one or more quality of service flows includes identifier information of a quality of service flow between the first terminal and the first user plane function, identifier information of a quality of service flow between the first user plane function and the second user plane function, and identifier information of a quality of service flow between the second user plane function and the second terminal.

In a possible design, the apparatus further includes a processing unit, configured to determine, based on the link quality information of the transmission path from the first terminal to the second terminal and a quality of service requirement of data that needs to be sent to the second terminal, a quality of service flow that carries the data.

According to a thirteenth aspect, an embodiment of this application further provides a communication apparatus. The communication apparatus includes: a processor, configured to execute computer instructions stored in a memory. When the computer instructions are executed, the apparatus is enabled to perform the method according to any one of the eleventh aspect or the possible designs of the eleventh aspect.

According to a fourteenth aspect, an embodiment of this application further provides a communication apparatus, including a processor and an interface circuit. The processor is configured to: communicate with another apparatus by using the interface circuit, and perform the method according to any one of the eleventh aspect or the possible designs of the eleventh aspect.

The communication apparatus in the twelfth aspect to the fourteenth aspect may be applied to a first terminal.

According to a fifteenth aspect, an embodiment of this application further provides a computer-readable storage medium, including computer software instructions, where when the computer software instructions are run on an electronic device such as a first terminal or is a chip built in the first terminal, the first terminal is enabled to perform the method according to any one of the eleventh aspect or the possible designs of the eleventh aspect.

It may be understood that, for beneficial effects that can be achieved in the twelfth aspect to the fifteenth aspect, refer to beneficial effects in any one of the eleventh aspect and the possible designs of the eleventh aspect. Details are not described herein again.

According to a sixteenth aspect, an embodiment of this application provides a link quality detection method. The method includes: A first user plane function sends a first link detection request to a first terminal. The first user plane function receives, from the first terminal, link quality information of a transmission path from the first user plane function to the first terminal.

In a possible design, the method further includes: The first user plane function receives a second link detection request from a second user plane function. The first user plane function sends, to the second user plane function, the link quality information of the transmission path from the first user plane function to the first terminal and link quality information of a transmission path from the second user plane function to the first user plane function.

In this design, the second user plane function may obtain link quality information of a transmission path from the second user plane function to the first terminal. The second user plane function may further obtain link quality information of a transmission path from a second terminal to the second user plane function. Therefore, the second user plane function may obtain link quality information of an entire transmission path from the second terminal to the first terminal. Subsequently, the second user plane function may send, to the second terminal, the link quality information of the entire transmission path from the second terminal to the first terminal.

In a possible design, the method further includes: The first user plane function sends a third link detection request to the second user plane function. The first user plane function receives, from the second user plane function, link quality information of a transmission path from the first user plane function to the second user plane function and link quality information of a transmission path from the second user plane function to the second terminal. The first user plane function sends, to the first terminal, link quality information of a transmission path from the first terminal to the first user plane function, the link quality information of the transmission path from the first user plane function to the second user plane function, and the link quality information of the transmission path from the second user plane function to the second terminal.

In this design, the first terminal may obtain link quality information of an entire transmission path from the first terminal to the second terminal.

In the sixteenth aspect, a link quality detection process may be initiated by a user plane function corresponding to each of the first terminal and/or the second terminal. An effect of the link quality detection process is similar to that in the eleventh aspect. Details are not described again.

According to a seventeenth aspect, an embodiment of this application provides a communication apparatus. The apparatus has a function of implementing the foregoing method in the sixteenth aspect. The function may be implemented by hardware, or may be implemented by executing corresponding software by hardware. The hardware or the software includes one or more units or modules corresponding to the function of the method according to the sixteenth aspect, for example, a receiving unit and a sending unit.

The sending unit is configured to send a first link detection request to a first terminal; and the receiving unit is configured to receive, from the first terminal, link quality information of a transmission path from a first user plane function to the first terminal.

In a possible design, the receiving unit is further configured to receive a second link detection request from a second user plane function; and the sending unit is further configured to send, to the second user plane function, the link quality information of the transmission path from the first user plane function to the first terminal and link quality information of a transmission path from the second user plane function to the first user plane function.

In a possible design, the sending unit is further configured to send a third link detection request to the second user plane function; the receiving unit is further configured to receive link quality information of a transmission path from the first user plane function to the second user plane function and link quality information of a transmission path from the second user plane function to a second terminal from the second user plane function; and the sending unit is further configured to send, to the first terminal, link quality information of a transmission path from the first terminal to the first user plane function, the link quality information of the transmission path from the first user plane function to the second user plane function, and the link quality information of the transmission path from the second user plane function to the second terminal.

According to an eighteenth aspect, an embodiment of this application further provides a communication apparatus. The communication apparatus includes: a processor, configured to execute computer instructions stored in a memory. When the computer instructions are executed, the apparatus is enabled to perform the method according to any one of the sixteenth aspect or the possible designs of the sixteenth aspect.

According to a nineteenth aspect, an embodiment of this application further provides a communication apparatus, including a processor and an interface circuit. The processor is configured to: communicate with another apparatus through the interface circuit, and perform the method according to any one of the sixteenth aspect or the possible designs of the sixteenth aspect.

The communication apparatus according to the seventeenth aspect to the nineteenth aspect may be applied to a first user plane function.

According to a twentieth aspect, an embodiment of this application further provides a computer-readable storage medium, including computer software instructions. When the computer software instructions are run on an electronic device such as a core network device or a chip built in the core network device, the core network device is enabled to perform the method according to any one of the sixteenth aspect or the possible designs of the sixteenth aspect.

It may be understood that, for beneficial effects that can be achieved in the seventeenth aspect to the twentieth aspect, refer to beneficial effects in any one of the sixteenth aspect and the possible designs of the sixteenth aspect. Details are not described herein again.

According to a twenty-first aspect, an embodiment of this application further provides a communication apparatus. The communication apparatus includes a transceiver unit and a processing unit. The transceiver unit may be configured to send and receive information, or configured to communicate with another network element. The processing unit may be configured to process data. For example, the apparatus may implement the method according to any one of the first aspect, the sixth aspect, the eleventh aspect, and the sixteenth aspect by using the transceiver unit and the processing unit.

According to a twenty-second aspect, an embodiment of this application further provides a computer program product, and when the computer program product is executed, the method according to any one of the first aspect, the sixth aspect, the eleventh aspect, and the sixteenth aspect may be implemented.

According to a twenty-third aspect, an embodiment of this application further provides a chip system, and the chip system is applied to a core network device. The chip system includes one or more interface circuits and one or more processors. The interface circuit and the processor are interconnected by a line. The processor receives and executes computer instructions from a memory of an electronic device by using the interface circuit, to implement the method according to any one of the first aspect, the sixth aspect, and the sixteenth aspect.

According to a twenty-fourth aspect, an embodiment of this application further provides a chip system. The chip system is applied to a terminal. The chip system includes one or more interface circuits and one or more processors. The interface circuit and the processor are interconnected by a line. The processor receives and executes computer instructions from a memory of an electronic device by using the interface circuit, to implement the method according to the eleventh aspect.

According to a twenty-fifth aspect, an embodiment of this application further provides a communication system. The communication system includes at least a first user plane function and a second user plane function, the first user plane function is configured to implement the method according to the first aspect, and the second user plane function is configured to implement the method according to the sixth aspect.

It may be understood that, for beneficial effects that can be achieved in the twenty-first aspect to the twenty-fifth aspect provided above, refer to the beneficial effects in the first aspect, the sixth aspect, the eleventh aspect, the sixteenth aspect, and the like. Details are not described herein again.

DETAILED DESCRIPTION OF ILLUSTRATIVE EMBODIMENTS

Figure 1:
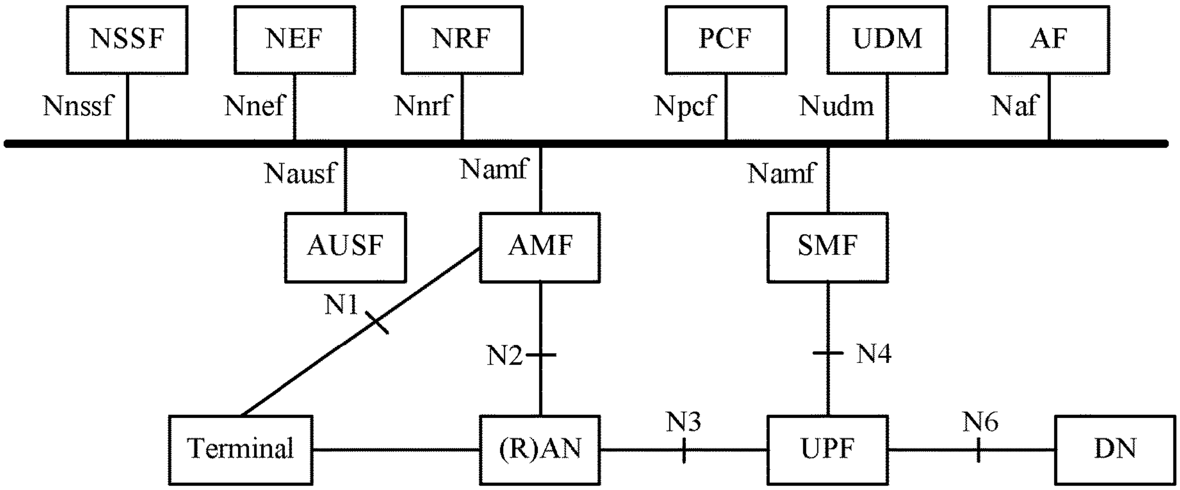
FIG. 1 is a schematic diagram of a 5G network architecture.

To cope with challenges of wireless broadband technologies and maintain a leading advantage of 3rd Generation Partnership Project (3GPP) networks, the 3GPP standard group formulates a next-generation mobile communication network architecture (next generation system), also referred to as a fifth-generation (5G) mobile communication network architecture. FIG. 1 is a schematic diagram of a 5G network architecture.

As shown in FIG. 1, the 5G network architecture may include a terminal, an access network (AN), a core network, and a data network (DN). In an implementation, the terminal may access the core network by using an access network device, and then access the DN by using the core network. In another implementation, the terminal may access the core network in a fixed access manner, to access the DN.

The terminal may also be referred to as user equipment (UE), a mobile station (MS), a mobile terminal (MT), or the like. In some embodiments, the terminal may be a device that provides a user with voice and/or data connectivity, for example, may be a mobile telephone ("cellular" telephone), a mobile phone, a computer, a cordless phone, a session initiation protocol (SIP) phone, a wireless local loop (WLL) station, a personal digital assistant (PDA), a laptop computer, a handheld communication device, a handheld computing device, a satellite wireless device, a wireless modem card, a television set-top box (STB), customer premises equipment (CPE), a wearable device (such as a smartwatch, a smart band, or a pedometer), an in-vehicle device (such as a car, a bicycle, an electric vehicle, an airplane, a ship, a train, and a high-speed train), a virtual reality (VR) device, an augmented reality (AR) device, a wireless terminal in industrial control, a smart home device (such as a refrigerator, a television, an air conditioner, and an electric meter), a smart robot, a workshop device, a wireless terminal in self driving, or a wireless terminal in remote medical surgery, a wireless terminal in a smart grid, a wireless terminal in transportation safety, a wireless terminal in a smart city, a wireless terminal in a smart home, a flight device (for example, a smart robot, a hot air balloon, an unmanned aerial vehicle, or an airplane), or another device used for communication in a wireless system. A specific representation form of the terminal is not limited in this application.

The AN mainly includes an AN device. The AN device may also be referred to as a radio access network device (RAN) device or a next-generation radio access network device. The terminal may communicate with the AN device. The AN device may provide the terminal with functional services such as radio resource management, quality of service management, and data encryption and compression. Different AN devices may communicate with each other through an Xn interface.

In some embodiments, the AN device may be a next generation node B (gNB), an evolved node B (eNB), a next generation evolved node B (ng-eNB), a transmission and reception point (TRP), a radio network controller (RNC), a base station controller (BSC), a base transceiver station (BTS), a home base station (for example, a home evolved NodeB, or a home Node B, HNB), a base band unit (BBU), or a wireless fidelity (Wi-Fi) access point (AP), or a central unit (CU), a distributed unit (DU), a central unit-control plane (CU-CP), a central unit-user plane (CU-UP), or the like.

The gNB may provide a new radio (NR) control plane and/or user plane protocol and function for a terminal 310, and access a 5G core network (5th generation core, 5GC). The ng-eNB may provide an evolved universal terrestrial radio access (E-UTRA) control plane and/or user plane protocol and function for the terminal 310, and access the 5GC. The CU mainly includes an RRC layer, a service data adaptation protocol (SDAP) layer, and a packet data convergence protocol (PDCP) layer of the gNB, or an RRC layer and a PDCP layer of the ng-eNB. The DU mainly includes a radio link control (RLC) layer, a medium access control (MAC) layer, and a physical layer of the gNB or ng-eNB. The CU-CP mainly includes an RRC layer in a gNB-CU or an ng-eNB-CU and a control plane at the PDCP layer. The CU-UP mainly includes an SDAP layer in the gNB-CU or the ng-eNB-CU and a user plane at the PDCP layer.

Network elements in the core network mainly include a user plane network element and a control plane network element, and a device configured to carry the user plane network element and the control plane network element is referred to as a core network device.

The user plane network element may be a user plane function (UPF), and is mainly responsible for externally connecting to a DN, routing and forwarding a user plane data packet, filtering a packet, performing a quality of service (QoS) control related function, charging information statistics collection, and the like.

The control plane network element is mainly responsible for service procedure interaction, delivering a data packet forwarding policy and a QoS control policy to the UPF, and the like. For example, the control plane network element may include a plurality of functional units such as an access and mobility management function (AMF), a session management function (SMF), an authentication server function (AUSF), a policy control function (PCF), an application function (AF), a unified data management function (UDM), and a network slice selection function (NSSF).

The AMF is mainly responsible for services such as mobility management and access management. The SMF is mainly responsible for session management, UE address management and assignment, a dynamic host configuration protocol function, selection and control of a user plane function, and the like. The AUSF is mainly responsible for a function of authenticating a terminal device. The PCF is mainly responsible for providing a unified policy framework for network behavior management, providing a policy rule of a control plane function, obtaining registration information related to a policy decision, and the like. The AF is configured to provide a service requirement, such as a routing rule and a processing policy, for a 3GPP core network.

It should be noted that network elements of the core network may independently work, or may be combined to implement some control functions, such as access control and mobility management functions such as access authentication, security encryption, and location registration of the terminal, and session management functions such as establishment, release, and change of a user plane transmission path.

The DN is mainly configured to provide a plurality of data services for the terminal device.

The network elements in the 5G network architecture shown in FIG. 1 may communicate with each other by using a next generation network (NG) interface. For example, continuing to refer to FIG. 1, a communication interface between the terminal and a control plane of the core network may be an NG interface 1, an N1 interface for short, and is configured to transmit network attached storage (NAS) signaling. A communication interface between the AN and the control plane (for example, an AMF) of the core network may be an N2 interface. A communication interface between the AN and the UPF may be an N3 interface, and is configured to transmit user data. A communication interface between the SMF and the UPF may be an N4 interface, and is used by the SMF to perform policy configuration on the UPF. The UPF may exchange user plane data with the DN through an N6 interface.

It should be noted that the foregoing is merely an example for describing the 5G network architecture, and is not intended to limit the 5G network architecture. For example, the 5G network architecture shown in FIG. 1 further includes a network repository function (NRF), a network exposure function (NEF), and the like. This is not limited herein.

In addition, it may be understood that the 5G network architecture shown in FIG. 1 is a 5G network architecture based on a service-based interface scenario. To be specific, when control plane network elements in some core networks are interconnected by a bus, a service-based interface is used. For example, the AUSF is connected to the bus through a Nausf interface, the AMF is connected to the bus through a Namf interface, the SMF is connected to the bus through an Nsmf interface, the AF is connected to the bus through a Naf interface, the UDM is connected to the bus through a Nudm interface, the PCF network element is connected to the bus through an Npcf interface, the NRF is connected to the bus through an Nnrf interface, the NEF is connected to the bus through an Nnef interface, and the NSSF is connected to the bus through an Nnssf interface.

However, it should be further noted that in another embodiment, the 5G network architecture may be a network architecture based on a reference point. This is not limited herein either.

For any two terminals that access the 5G network by using the foregoing 5G network architecture, the 5G network may provide end-to-end transmission of service data between the two terminals. For example, a terminal 1 may send service data to a terminal 2 by using a 5G network.

In a possible scenario in which end-to-end service data transmission is implemented by using the 5G network, two terminals share a same UPF, and service data between the two terminals is forwarded by using the shared UPF. For example, FIG. 2 is a schematic diagram of transmission of service data between two terminals.

Figure 2:
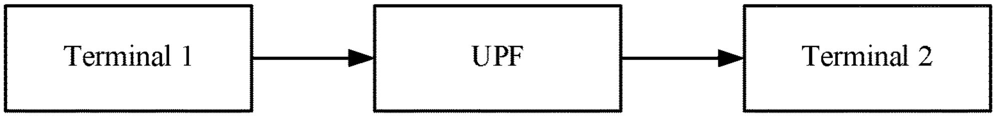
FIG. 2 is a schematic diagram of transmission of service data between two terminals.

As shown in FIG. 2, an example in which a terminal 1 sends service data to a terminal 2 is used. When the terminal 1 and the terminal 2 share a same UPF, the terminal 1 may first send service data to the UPF, and the UPF may forward the received service data to the terminal 2, to implement transmission of the service data from the terminal 1 to the terminal 2.

In another possible scenario in which end-to-end service data transmission is implemented by using a 5G network, two terminals are respectively connected to different UPFs, and service data between the two terminals is forwarded by using UPFs respectively connected to the two terminals. For example, FIG. 3 is another schematic diagram of transmission of service data between two terminals.

Figure 3:
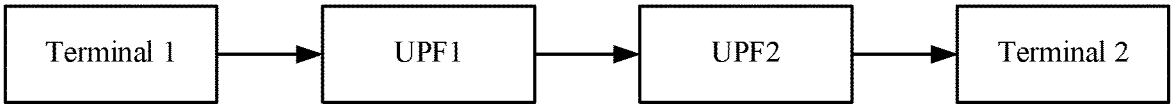
FIG. 3 is another schematic diagram of transmission of service data between two terminals.

As shown in FIG. 3, that a terminal 1 sends service data to a terminal 2 is also used as an example. When the terminal 1 is connected to a UPF1, and the terminal 2 is connected to a UPF2, the terminal 1 may first send service data to the UPF1, the UPF1 may forward the received service data to the UPF2, and the UPF2 may then forward the received service data to the terminal 2, to implement transmission of the service data from the terminal 1 to the terminal 2.

A communication interface (for example, a communication interface between the UPF1 and the UPF2) between different UPFs may be an N9 interface, and is configured to transmit user data.

In addition, it may be understood that in the foregoing two scenarios in which end-to-end service data transmission is implemented by using the 5G network, when the terminal accesses a core network in a fixed access manner, service data may be directly transmitted between a terminal and a UPF. When the terminal accesses the core network by using an access network device (for example, a base station), transmission of service data between the terminal and the UPF may be implemented through forwarding by the access network device.

Currently, for the foregoing scenario in which end-to-end service data transmission is implemented by using a 5G network, to ensure end-to-end quality of service of a service, a 5G QoS model based on a QoS flow is proposed. The 5G QoS model includes a guaranteed bit rate QoS flow (GBR QoS flow) and a non-guaranteed bit rate QoS flow (Non-GBR QoS flow). Same transmission processing (such as scheduling or an admission threshold) is performed on data packets included in a same QoS flow. The terminal may establish one or more packet data unit (PDU) sessions with a 5G system, and one or more QoS flows may be established in each PDU session. Each QoS flow has one QoS flow identifier (QFI), and the QFI can uniquely identify one QoS flow in a PDU session.

It can be learned that in the scenario in which the two terminals share a same UPF, data transmission is performed between the terminal and the UPF based on a QoS flow in the 5G network, so that end-to-end QoS guarantee can be provided for transmission of service data between the two terminals. However, in the foregoing scenario in which the two terminals are respectively connected to different UPFs, the 5G network can only provide QoS guarantee for service data transmission between each terminal and a UPF corresponding to the terminal, but cannot provide overall end-to-end QoS guarantee between the two terminals.

Based on this, an embodiment of this application provides a data transmission method, which may be applied to a scenario in which end-to-end transmission of service data between the two terminals is implemented by using a 5G network when the two terminals are respectively connected to different UPFs. The method includes: receiving, by a first UPF, data from a first terminal, where the data is data sent by the first terminal to a second terminal; and sending, by the first UPF, the data to a second UPF through a first QoS flow, where the second UPF is a UPF corresponding to the second terminal. The second UPF sends the data to the second terminal.

In the method, data transmission is performed between the first UPF and the second UPF through the first QoS flow, and data transmission can also be performed between the first terminal and the first UPF and between the second terminal and the second UPF based on the QoS flow. Therefore, reliable QoS guarantee can be provided in an entire transmission path from the first terminal to the second terminal for data sent by the first terminal to the second terminal. Similarly, the method can also provide reliable QoS guarantee for data sent by the second terminal to the first terminal. Therefore, the method can provide overall end-to-end QoS guarantee between the first terminal and the second terminal.

The following describes a data transmission method provided in an embodiment of this application by using an example with reference to the accompanying drawings.

It should be noted that, in descriptions of this application, words such as "first" and "second" are merely used for distinguishing and description, and are not used to specially limit a feature. In descriptions of embodiments of this application, the term "and/or" describes an association relationship between associated objects and indicates that three relationships may exist. For example, A and/or B may indicate the following three cases: Only A exists, both A and B exist, and only B exists. The character "/" generally indicates an "or" relationship between the associated objects. In this application, "at least one" means one or more, and "a plurality of" means two or more.

Figure 4:
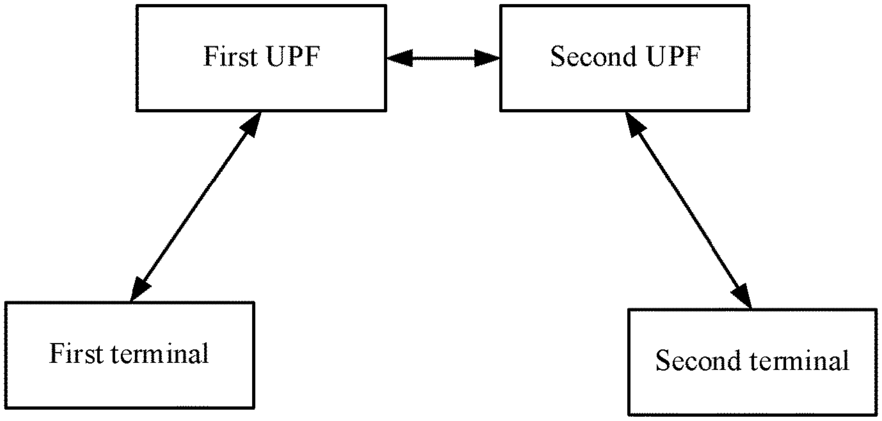
FIG. 4 is a schematic diagram of an application scenario according to an embodiment of this application.

FIG. 4 is a schematic diagram of an application scenario according to an embodiment of this application. As shown in FIG. 4, an application scenario in embodiments of this application includes at least a first terminal, a first UPF, a second terminal, and a second UPF.

The first UPF is a user plane network element serving the first terminal, and the second UPF is a user plane network element serving the second terminal. For example, the first UPF may be an anchor UPF of the first terminal, an intermediate UPF, an offloading node, or the like.

Optionally, the first UPF and the second UPF may have respective corresponding control plane network elements SMFs. For example, the control plane network element corresponding to the first UPF is a first SMF (not shown in the figure), the control plane network element corresponding to the second UPF is a second SMF (not shown in the figure), the first SMF serves a session of the first terminal, and the second SMF serves a session of the second terminal.

Alternatively, the first UPF and the second UPF also correspond to a same control plane network element SMF, and the SMF may separately serve a session of the first terminal and a session of the second terminal. This is not limited in this application.

For specific connection relationships, communication interfaces, and the like between network elements (such as the first terminal, the first UPF, the second terminal, the second UPF, and the SMF) in the scenario shown in FIG. 4, refer to the 5G network architecture shown in FIG. 1. Details are not described herein again.

It may be understood that the application scenario shown in FIG. 4 is merely intended to describe the technical solutions in embodiments of this application more clearly, and does not constitute a limitation on the technical solutions provided in embodiments of this application. For example, the application scenario may further include another device or network element, for example, a network control device or another network element in the 5G network architecture shown in FIG. 1.

In addition, a person of ordinary skill in the art may learn that the technical solutions provided in embodiments of this application are also applicable to a similar technical problem as a network architecture evolves and a new service scenario emerges.

Figure 5:
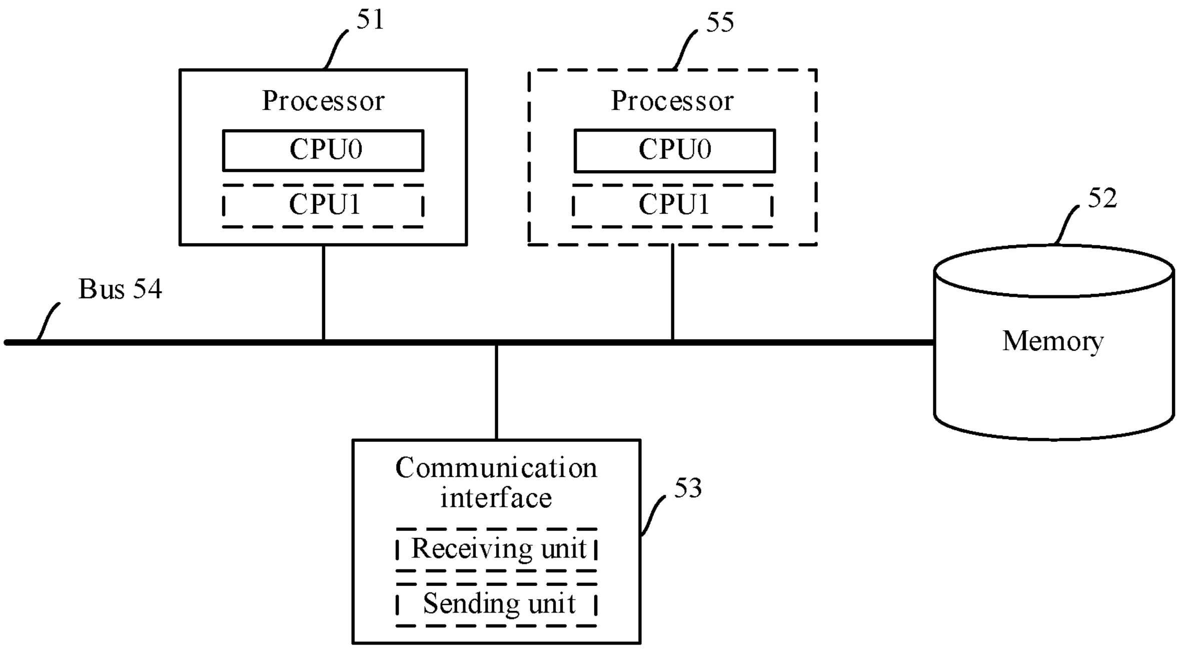
FIG. 5 is a schematic composition diagram of a terminal according to an embodiment of this application.

FIG. 5 is a schematic composition diagram of a terminal according to an embodiment of this application. The terminal may be the first terminal or the second terminal in the application scenario shown in FIG. 4. As shown in FIG. 5, the terminal may include: at least one processor 51, a memory 52, a communication interface 53, and a bus 54.

The following makes specific introduction of components of the terminal with reference to FIG. 5.

The processor 51 is a control center of the terminal, and may be one processor or a collective term of a plurality of processing elements. For example, the processor 51 may be a central processing unit (CPU), or may be an application-specific integrated circuit (ASIC), or may be configured as one or more integrated circuits implementing embodiments of this application, for example, one or more microprocessors (DSPs), or one or more field programmable gate arrays (FPGAs).

The processor 51 may perform various functions of the terminal by running or executing a software program stored in the memory 52, and invoking data stored in the memory 52.

In specific implementation, in an embodiment, the processor 51 may include one or more CPUs such as a CPU 0 and a CPU 1 shown in FIG. 5.

In specific implementation, in an embodiment, the network device may include a plurality of processors, for example, the processor 51 and a processor 55 shown in FIG. 5. Each of the processors may be a single-core processor (single-CPU) or may be a multi-core processor (multi-CPU). The processor herein may be one or more devices, circuits, and/or processing cores configured to process data (for example, computer program instructions).

The memory 52 is configured to store a software program for performing method steps performed by the terminal in the solutions of this application, and the processor 51 controls execution. The memory 52 may be a read-only memory (ROM) or another type of static storage device that can store static information and instructions, or a random access memory (RAM) or another type of dynamic storage device that can store information and instructions; or may be an electrically erasable programmable read-only memory (EEPROM), a compact disc read-only memory (CD-ROM) or other compact disc storage, optical disc storage (which includes a compact disc, a laser disc, an optical disc, a digital versatile disc, a Blu-ray disc, and the like), a magnetic disk storage medium or another magnetic storage device, or any other medium that can be used to carry or store expected program code having an instruction or a data structure form and that can be accessed by a computer. However, this is not limited herein.

The memory 52 may exist independently, and is connected to the processor 51 by the bus 54. Alternatively, the memory 52 may alternatively be integrated with the processor 51. This is not limited herein.

The communication interface 53 is configured to communicate with another device or another communication network by using any transceiver-type apparatus. The communication interface 53 may be an Ethernet interface, a radio access network (RAN) interface, a wireless local area network (WLAN) interface, or the like. The communication interface 53 may include a receiving unit to implement a receiving function and a sending unit to implement a sending function.

The bus 54 may be an industry standard architecture (ISA) bus, a peripheral component interconnect (PCI) bus, an extended industry standard architecture (EISA) bus, or the like. The bus may be classified into an address bus, a data bus, a control bus, and the like. For ease of representation, only one bold line is used to represent the bus in FIG. 5, but this does not mean that there is only one bus or only one type of bus.

Although the bus 54 is used in FIG. 5, it may be understood that the bus 54 may also be replaced with a connection relationship in another form, and is not limited to the bus itself.

Optionally, in the application scenario shown in FIG. 4, the structure of the core network device used to carry the first UPF and/or the second UPF may also include some structures similar to those of the terminal shown in FIG. 5, such as a processor, a memory, a communication interface, and a bus, to implement various functions corresponding to the first UPF or the second UPF. Details are not described herein again.

Figure 6A:
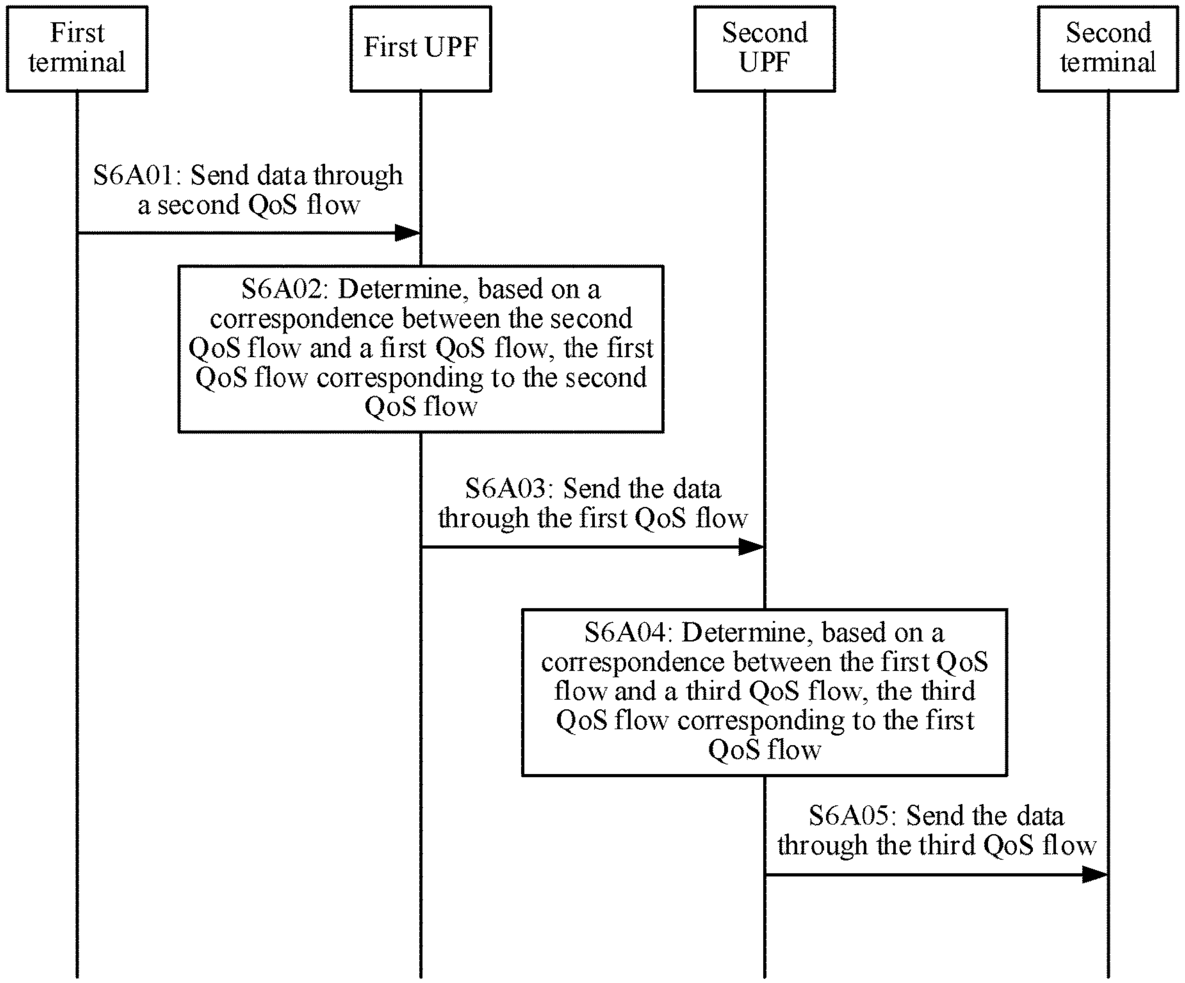
FIG. 6A is a schematic flowchart of a data transmission method according to an embodiment of this application.

FIG. 6A is a schematic flowchart of a data transmission method according to an embodiment of this application. As shown in FIG. 6A, the data transmission method may include S6A01 to S6A05. Data transmitted in S6A01 to S6A05 is service data sent by a first terminal to a second terminal.

S6A01: The first terminal sends data to a first UPF through a second QoS flow.

Correspondingly, the first UPF receives the data from the first terminal through the second QoS flow.

The first terminal establishes a PDU session in advance by using a corresponding SMF (for example, a first SMF), and creates one or more QoS flows, referred to as a second QoS flow below, in a process of establishing the PDU session. That is, the PDU session of the first terminal includes one or more second QoS flows.

When the first terminal needs to send data to the first UPF, the first terminal may select, from the second QoS flow included in the PDU session based on a QoS requirement of the data that needs to be sent, a second QoS flow that satisfies the QoS requirement. Then, the first terminal may send the data to the first UPF through the second QoS flow that satisfies the QoS requirement.

For example, the QoS requirement may include 5QI information. A 5QI is a scalar for indexing a corresponding 5G QoS feature value. 5QIs include a standardized 5QI, a preconfigured 5QI, and a dynamically allocated 5QI.

S6A02: The first UPF determines, based on a correspondence between the second QoS flow and a first QoS flow, the first QoS flow corresponding to the second QoS flow.

The correspondence between the second QoS flow and the first QoS flow is determined based on a QoS requirement that can be satisfied by the second QoS flow and a QoS requirement that can be satisfied by the first QoS flow.

In some embodiments, the correspondence between the second QoS flow and the first QoS flow may be configured by an SMF corresponding to the first UPF for the first UPF. For example, the first UPF may receive first configuration information from the first SMF, and the first configuration information is for indicating the correspondence between the second QoS flow and the first QoS flow.

Optionally, the first configuration information includes identifier information of the second QoS flow and identifier information of the first QoS flow corresponding to the second QoS flow. The identifier information of the second QoS flow and the identifier information of the first QoS flow may be the foregoing QFIs.

In some implementations, the identifier information of the second QoS flow may be the same as that of the first QoS flow. Alternatively, in another implementation, the identifier information of the second QoS flow may be different from that of the first QoS flow. This is not limited herein in this application.

Optionally, the first configuration information may further include identifier information of a first interface. The identifier information of the first interface is for indicating the first UPF to send data to a second UPF on the first interface through the first QoS flow.

The first interface may be an N9 interface or a tunnel between the first UPF and the second UPF, for example, a general packet radio service tunneling protocol (GTP-U) tunnel.

It should be understood that the first configuration information is a forwarding rule configured by the first SMF for the first UPF. Forwarding rules include a packet detection rule (PDR) and a forwarding action rule (FAR). The PDR is for matching a packet, and the FAR is for indicating processing on the packet. Therefore, for the first configuration information, a PDR configured by the first SMF for the first UPF includes the identifier information of the second QoS flow, and a FAR includes the identifier information of the first QoS flow corresponding to the second QoS flow and the identifier information of the first interface.

S6A03: The first UPF sends the data to the second UPF through the first QoS flow.

Correspondingly, the second UPF receives the data from the first UPF through the first QoS flow.

S6A04: The second UPF determines, based on a correspondence between the first QoS flow and a third QoS flow, the third QoS flow corresponding to the first QoS flow.

The correspondence between the first QoS flow and the third QoS flow is determined based on the QoS requirement that can be satisfied by the first QoS flow and a QoS requirement that can be satisfied by the third QoS flow.

In some embodiments, the correspondence between the first QoS flow and the third QoS flow may be configured by an SMF corresponding to the second UPF for the second UPF. For example, the second UPF may receive second configuration information from a second SMF, and the second configuration information is for indicating the correspondence between the first QoS flow and the third QoS flow.

It may be understood that, if the first UPF and the second UPF correspond to a same SMF, the SMF configures the first configuration information for the first UPF, and configures the second configuration information for the second UPF.

Optionally, the second configuration information includes the identifier information of the first QoS flow and identifier information of the third QoS flow corresponding to the first QoS flow. The identifier information of the third QoS flow may also be the foregoing QFI.

In some implementations, the identifier information of the first QoS flow may be the same as that of the third QoS flow. Alternatively, in another implementation, the identifier information of the first QoS flow may be different from that of the third QoS flow. This is not limited herein in this application.

It should also be understood that the second configuration information is a forwarding rule configured by the second SMF for the second UPF. Therefore, for the second configuration information, a PDR configured by the second SMF for the second UPF includes the identifier information of the first QoS flow, and a FAR includes the identifier information of the third QoS flow corresponding to the first QoS flow.

It can be learned that, from the perspective of an overall transmission path from the first terminal to the second terminal, the correspondence exists between the second QoS flow and the first QoS flow, and the correspondence exists between the first QoS flow and the third QoS flow.

In a possible implementation, for a second QoS flow, the identifier information of the first QoS flow corresponding to the second QoS flow is the same as the identifier information of the second QoS flow, and the identifier information of the third QoS flow corresponding to the first QoS flow is the same as the identifier information of the first QoS flow. In other words, the second QoS flow, the first QoS flow, and the third QoS flow that successively have the correspondence may have the same identifier information.

S6A05: The second UPF sends the data to the second terminal through the third QoS flow.

Correspondingly, the second terminal receives the data from the second UPF through the third QoS flow.

Figure 7:
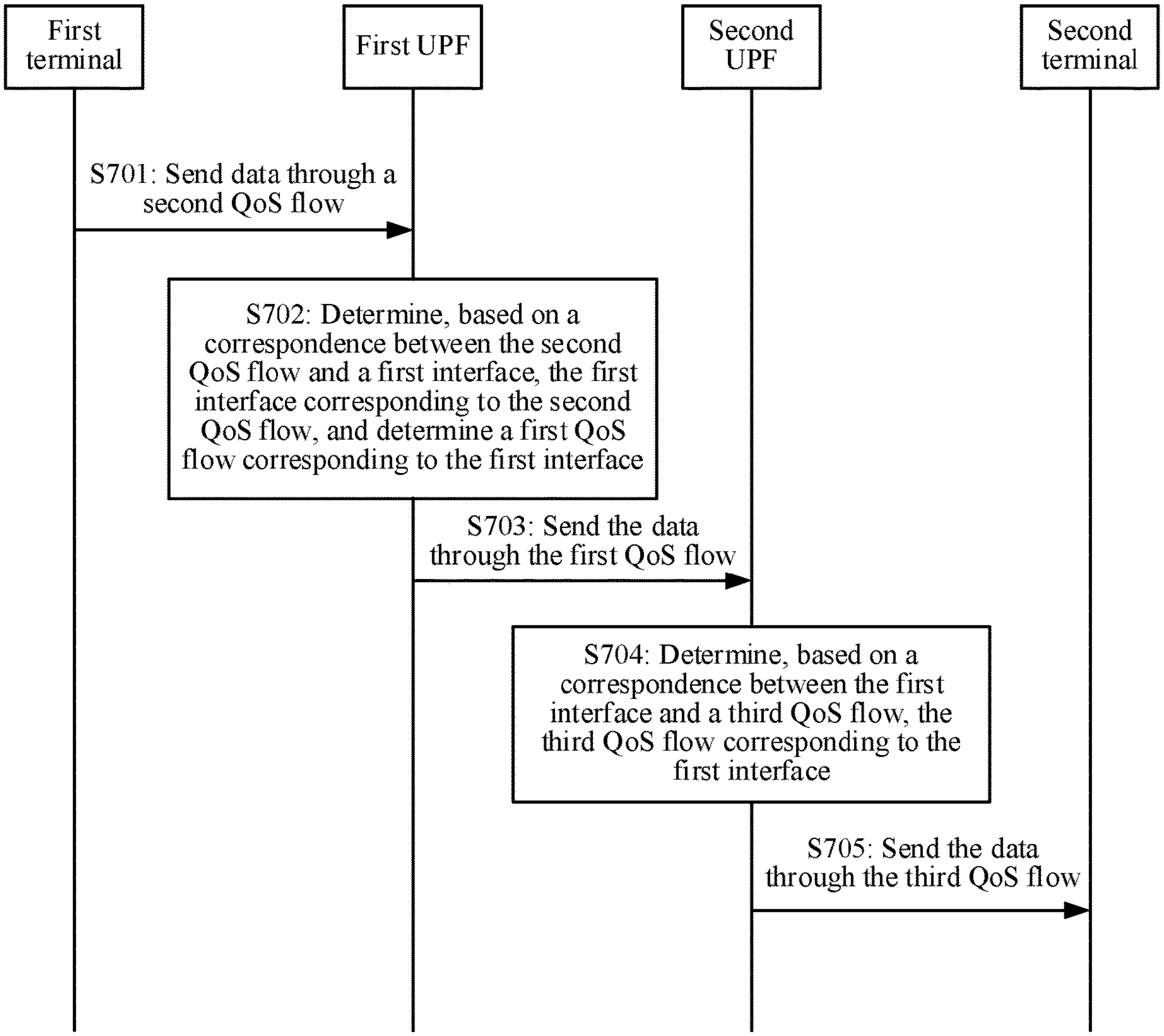
FIG. 7 is another schematic flowchart of a data transmission method according to an embodiment of this application.

The following uses an example in which the first terminal is UE 1, the second terminal is UE 2, the first UPF is a UPF1, and the second UPF is a UPF2 to describe the process shown in FIG. 7 with reference to a process in which the UE 1 sends a packet P to the UE 2.

The UE 1 may first determine the second QoS flow, for example, a QoS flow 3, based on a QoS requirement of the packet P, and send the packet P to the UPF1 through the second QoS flow. After receiving the packet P, the UPF1 may determine a first QoS flow corresponding to the second QoS flow, for example, the QoS flow 3, and send the packet P to the UPF2 through the first QoS flow. After receiving the packet P, the UPF2 may determine a third QoS flow corresponding to the first QoS flow, for example, the QoS flow 3, and send the packet P to the UE 2 through the third QoS flow. In this way, the UE 1 sends the packet P to the UE 2.

It can be learned from the foregoing that, in the embodiment shown in FIG. 6A, data transmission is performed between the first terminal and the first UPF through the second QoS flow, data transmission is performed between the first UPF and the second UPF through the first QoS flow, and data transmission is performed between the second UPF and the second terminal through the third QoS flow. Therefore, in the entire transmission path from the first terminal to the second terminal, reliable QoS guarantee can be provided for the data sent by the first terminal to the second terminal.

Figure 6B:
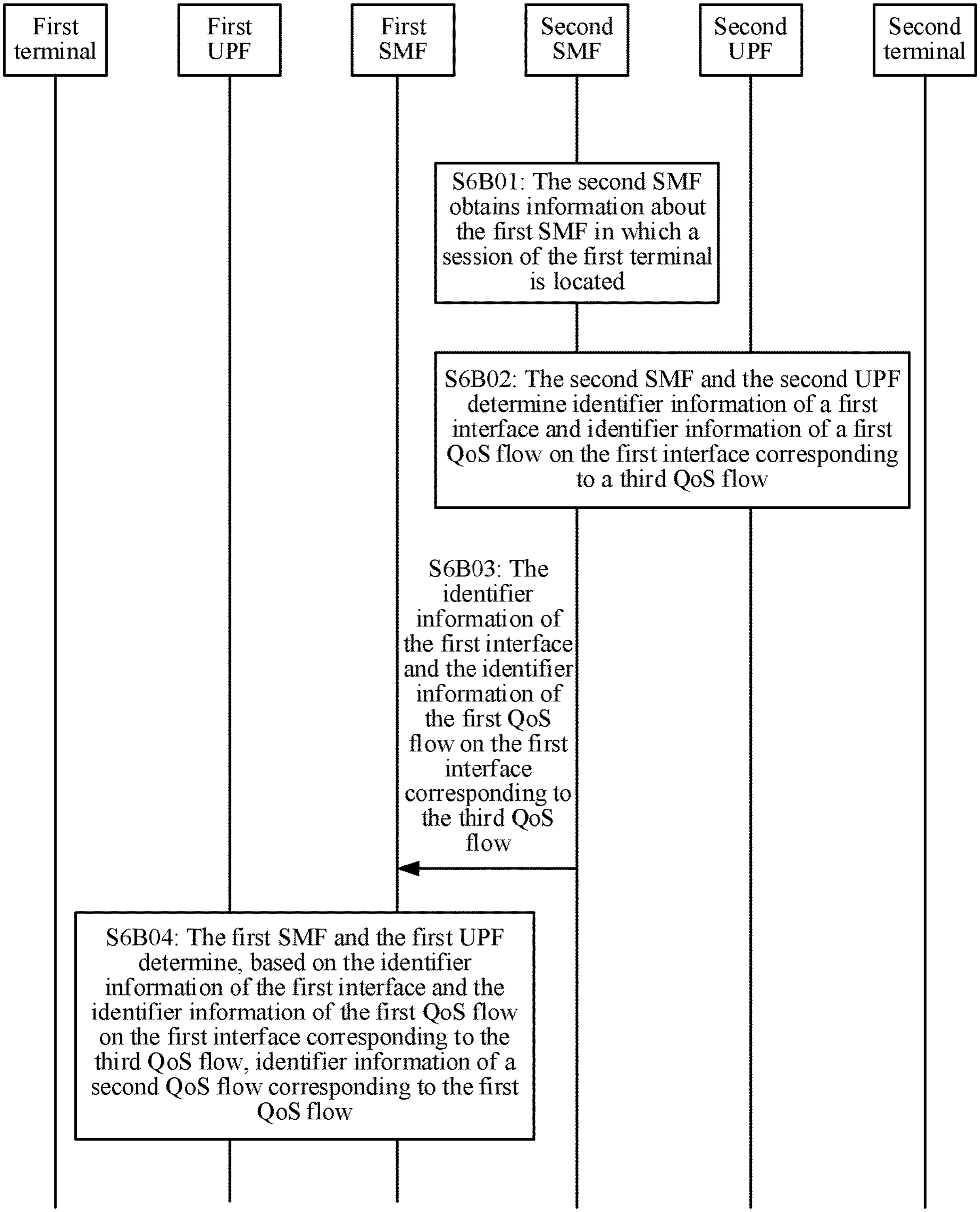
FIG. 6B is a schematic flowchart of establishing a QoS flow correspondence according to an embodiment of this application.

With reference to FIG. 6B, the following describes a process of establishing the correspondence between the second QoS flow and the first QoS flow and the correspondence between the first QoS flow and the third QoS flow that are mentioned in the embodiment shown in FIG. 6A.

FIG. 6B is a schematic flowchart of establishing a QoS flow correspondence according to an embodiment of this application. As shown in FIG. 6B, for example, the first UPF and the second UPF have respective corresponding control plane network elements SMFs. The control plane network element corresponding to the first UPF is the first SMF, and the control plane network element corresponding to the second UPF is the second SMF. In a possible design, the correspondence between the second QoS flow and the first QoS flow and the correspondence between the first QoS flow and the third QoS flow may be determined in the manners shown in S6B01 to S6B04.

S6B01: The second SMF obtains information about the first SMF in which a session of the first terminal is located.

For example, when determining that a link is created between the second terminal and the first terminal, the second SMF may obtain the information about the first SMF in which the session of the first terminal is located. In an implementation, in a process of creating a session of the second terminal, the second SMF obtains, from subscription data, an identifier of the first terminal and a requirement for creating the link from the first terminal to the second terminal, to determine that the link needs to be created between the second terminal and the first terminal. Alternatively, in another implementation, when determining that the link needs to be created between the second terminal and the first terminal, the control plane network element (for example, the AF) sends a message to the second SMF, where the message includes an identifier of the first terminal and an indication for creating the link. Subsequently, the second SMF may obtain, through query from the control plane of the network in which the first terminal is located, the information about the first SMF in which the session of the first terminal is located.

S6B02: The second SMF and the second UPF determine the identifier information of the first interface and the identifier information of the first QoS flow on the first interface corresponding to the third QoS flow.

The first interface is an interface that is on the second UPF and that receives data from the first UPF. For example, for a GTP-U tunnel, the identifier information of the first interface includes an IP address and a tunnel endpoint identifier (TEID) of the second UPF. The third QoS flow is a QoS flow in the session of the second terminal. For example, the identifier information of the first QoS flow corresponding to the third QoS flow may be determined based on a QoS requirement of transmission of service data from the first terminal to the second terminal, to obtain the correspondence between the first QoS flow and the third QoS flow. For a first QoS flow, a third QoS flow corresponding to the first QoS flow, the first QoS flow, and a second QoS flow that corresponds to the first QoS flow and that is determined in subsequent step S6B04, can satisfy the QoS requirement of transmission of service data from the first terminal to the second terminal.

Optionally, that the second SMF and the second UPF determine the identifier information of the first interface on which the second UPF receives the data from the first UPF and the identifier information of the first QoS flow on the first interface corresponding to the third QoS flow in the session of the second terminal may refer to that the second SMF determines and then sends the identifier information to the second UPF, or the second UPF determines and then sends the identifier information to the second SMF, or each of the second SMF and the second UPF determines a part of the identifier information. For example, the second SMF determines the identifier information of the first interface on which the second UPF receives the data from the first UPF, and then sends the identifier information to the second UPF, and then the second UPF determines the identifier information of the first QoS flow on the first interface corresponding to the third QoS flow in the session of the second terminal. Alternatively, the second UPF determines the identifier information of the first interface for receiving the data from the first UPF, and then sends the identifier information to the second SMF. Then, the second SMF determines the identifier information of the first QoS flow on the first interface corresponding to the third QoS flow in the session of the second terminal.

S6B03: The second SMF sends, to the first SMF, the identifier information of the first interface and the identifier information of the first QoS flow on the first interface corresponding to the third QoS flow.

That the second SMF sends, to the first SMF, the identifier information of the first interface and the identifier information of the first QoS flow on the first interface corresponding to the third QoS flow means that the second SMF sends a correspondence between the first QoS flow and the third QoS flow to the first SMF. For example, the second SMF may send the foregoing information to the first SMF by using an Nsmf_PDUSession_Update message. Alternatively, the foregoing information is sent to the first SMF via a PCF. The information sent by the second SMF to the first SMF further includes a QoS requirement corresponding to the third QoS flow and the first QoS flow.

S6B04: The first SMF and the first UPF determine, based on the identifier information of the first interface and the identifier information of the first QoS flow on the first interface corresponding to the third QoS flow, the identifier information of the second QoS flow corresponding to the first QoS flow.

For example, the first SMF and the first UPF determine, based on the identifier information of the first interface on which the second UPF receives the data from the first UPF, the identifier information of the first QoS flow on the first interface corresponding to the third QoS flow in the session of the second terminal, and the QoS requirement corresponding to the first QoS flow, the identifier information of the second QoS flow corresponding to the first QoS flow in the session of the first terminal. In this case, the first UPF obtains the correspondence between the second QoS flow and the first QoS flow.

For the processes shown in S6B01 to S6B04, when the first UPF and the second UPF correspond to a same control plane network element SMF, S6B03 does not exist. Other processes are similar, and details are not described again.

According to the processes shown in S6B01 to S6B04, it may be determined that the correspondence exists between the second QoS flow and the first QoS flow, and the correspondence exists between the first QoS flow and the third QoS flow. In other words, the second QoS flow, the first QoS flow, and the third QoS flow have a sequential correspondence. The second QoS flow, the first QoS flow, and the third QoS flow that have a correspondence can satisfy an end-to-end QoS requirement of a data flow between the first terminal and the second terminal. For example, bandwidths of the second QoS flow, the first QoS flow, and the third QoS flow are greater than or equal to a bandwidth requirement of the data flow, and a sum of respective delays of the second QoS flow, the first QoS flow, and the third QoS flow is less than or equal to a delay requirement of the data flow.

It can be learned that in the embodiment shown in FIG. 6A, the correspondence exists between the second QoS flow and the first QoS flow, and the correspondence exists between the first QoS flow and the third QoS flow. In another possible design, a correspondence may exist between the second QoS flow and the first interface, and a correspondence may exist between the first interface and the third QoS flow.

For example, an embodiment of this application further provides a data transmission method. FIG. 7 is another schematic flowchart of a data transmission method according to an embodiment of this application. As shown in FIG. 7, the data transmission method may include S701 to S705. Data transmitted in S701 to S705 is service data sent by a first terminal to a second terminal.

S701: The first terminal sends data to a first UPF through a second QoS flow.

Correspondingly, the first UPF receives the data from the first terminal through the second QoS flow.

For a specific description of S701, refer to the foregoing S6A01. Details are not described again.

S702: The first UPF determines, based on a correspondence between the second QoS flow and a first interface, the first interface corresponding to the second QoS flow, and determines a first QoS flow corresponding to the first interface.

The correspondence between the second QoS flow and the first interface is determined based on a QoS requirement that can be satisfied by the second QoS flow and a QoS requirement that can be satisfied by the first interface. The first QoS flow corresponding to the first interface is a first QoS flow on the first interface.

In some embodiments, the correspondence between the second QoS flow and the first interface may also be configured by an SMF corresponding to the first UPF for the first UPF. For example, the first UPF may receive first configuration information from a first SMF. In this case, the first configuration information is for indicating the correspondence between the second QoS flow and the first interface.

Optionally, the first configuration information includes identifier information of the second QoS flow and identifier information of the first interface corresponding to the second QoS flow. The identifier information of the second QoS flow may be the foregoing QFI, and the identifier information of the first interface may be an interface identifier of an N9 interface or the foregoing TEID of the GTP-U tunnel.

S703: The first UPF sends the data to the second UPF through the first QoS flow.

In other words, the first UPF sends the data to the second UPF through the first QoS flow on the first interface.

Correspondingly, the second UPF receives the data from the first UPF through the first QoS flow.

S704: The second UPF determines, based on a correspondence between the first interface and a third QoS flow, the third QoS flow corresponding to the first interface.

The correspondence between the first interface and the third QoS flow is determined based on the QoS requirement that can be satisfied by the first interface and a QoS requirement that can be satisfied by the third QoS flow.

In some embodiments, the correspondence between the first interface and the third QoS flow may also be configured by an SMF corresponding to the second UPF for the second UPF. For example, the second UPF may receive second configuration information from a second SMF. In this case, the second configuration information is for indicating the correspondence between the first interface and the third QoS flow.

It may also be understood that, if the first UPF and the second UPF correspond to a same SMF, the SMF configures the first configuration information for the first UPF, and configures the second configuration information for the second UPF.

Optionally, the second configuration information includes the identifier information of the first interface and identifier information of the third QoS flow corresponding to the first interface. The identifier information of the third QoS flow may also be the foregoing QFI.

It can be learned that, from the perspective of an overall transmission path from the first terminal to the second terminal, the correspondence exists between the second QoS flow and the first interface, and the correspondence exists between the first interface and the third QoS flow.

S705: The second UPF sends the data to the second terminal through the third QoS flow.

Correspondingly, the second terminal receives the data from the second UPF through the third QoS flow.

The following also uses an example in which the first terminal is UE 1, the second terminal is UE 2, the first UPF is a UPF1, and the second UPF is a UPF2 to describe the process shown in FIG. 7 It should with reference to a process in which the UE 1 sends a packet P to the UE 2.

The UE 1 may first determine the second QoS flow, for example, a QoS flow 3, based on a QoS requirement of the packet P, and send the packet P to the UPF1 through the second QoS flow. After receiving the packet P, the UPF1 may determine the first interface corresponding to the second QoS flow, and send the packet P to the UPF2 through the first QoS flow on the first interface. For example, the packet P may be a QoS flow 4. After receiving the packet P, the UPF2 may determine a third QoS flow corresponding to the first interface, for example, the QoS flow 5, and send the packet P to the UE 2 through the third QoS flow. In this way, the UE 1 sends the packet P to the UE 2.

It can be learned from the foregoing that, in the embodiment shown in FIG. 7, data transmission is performed between the first terminal and the first UPF through the second QoS flow, data transmission is performed between the first UPF and the second UPF through the first QoS flow on the first interface corresponding to the second QoS flow, and data transmission is performed between the second UPF and the second terminal through the third QoS flow corresponding to the first interface. Therefore, in the entire transmission path from the first terminal to the second terminal, reliable QoS guarantee can also be provided for the data sent by the first terminal to the second terminal.

In addition, it should be noted that in the embodiment shown in FIG. 7, a specific method for configuring the first configuration information and the second configuration information is the same as or similar to a configuration rule for the PDR and the FAR in the embodiment shown in FIG. 6A, and details are not described again. A process of establishing the correspondence between the second QoS flow and the first interface and the correspondence between the first interface and the third QoS flow is also similar to a process of establishing the correspondence between the second QoS flow and the first QoS flow and the correspondence between the first QoS flow and the third QoS flow shown in FIG. 6B. Details are not described herein again.

Optionally, in embodiments of this application, the data sent by the first terminal to the second terminal further includes a user tunnel identifier, and the user tunnel identifier is for indicating that the data is data sent by the first terminal to the second terminal. For example, when receiving the data from the first terminal, the first UPF can determine, based on the user tunnel identifier in the data, that the data is the data sent by the first terminal to the second terminal, and send the data to the second UPF corresponding to the second terminal.

Optionally, the user tunnel identifier may be some fields that are added by the first terminal to the data and that can identify the transmission path from the first terminal to the second terminal. For example, the fields may be added to a GTP-U header, or may be added to a GTP-U upper layer, which is not limited herein.

The user tunnel identifier is added to the data sent by the first terminal to the second terminal, so that the first UPF can determine, based on the user tunnel identifier in the received data, an end-to-end forwarding service, and distinguish the end-to-end forwarding service from an 5G LAN service. A packet of the 5G LAN service is forwarded based on a destination address in the packet. However, in embodiments of this application, an end-to-end service is forwarded based on a flow, and the UPF is unaware of the destination address in the packet.

It can be learned that in the embodiment shown in FIG. 7, the correspondence exists between the second QoS flow and the first interface, and the correspondence exists between the first interface and the third QoS flow. Different from the embodiments shown in FIG. 6A and FIG. 7, in still another possible design, the first UPF and the second UPF may not forward, based on the correspondence, the data sent by the first terminal to the second terminal.

Figure 8:
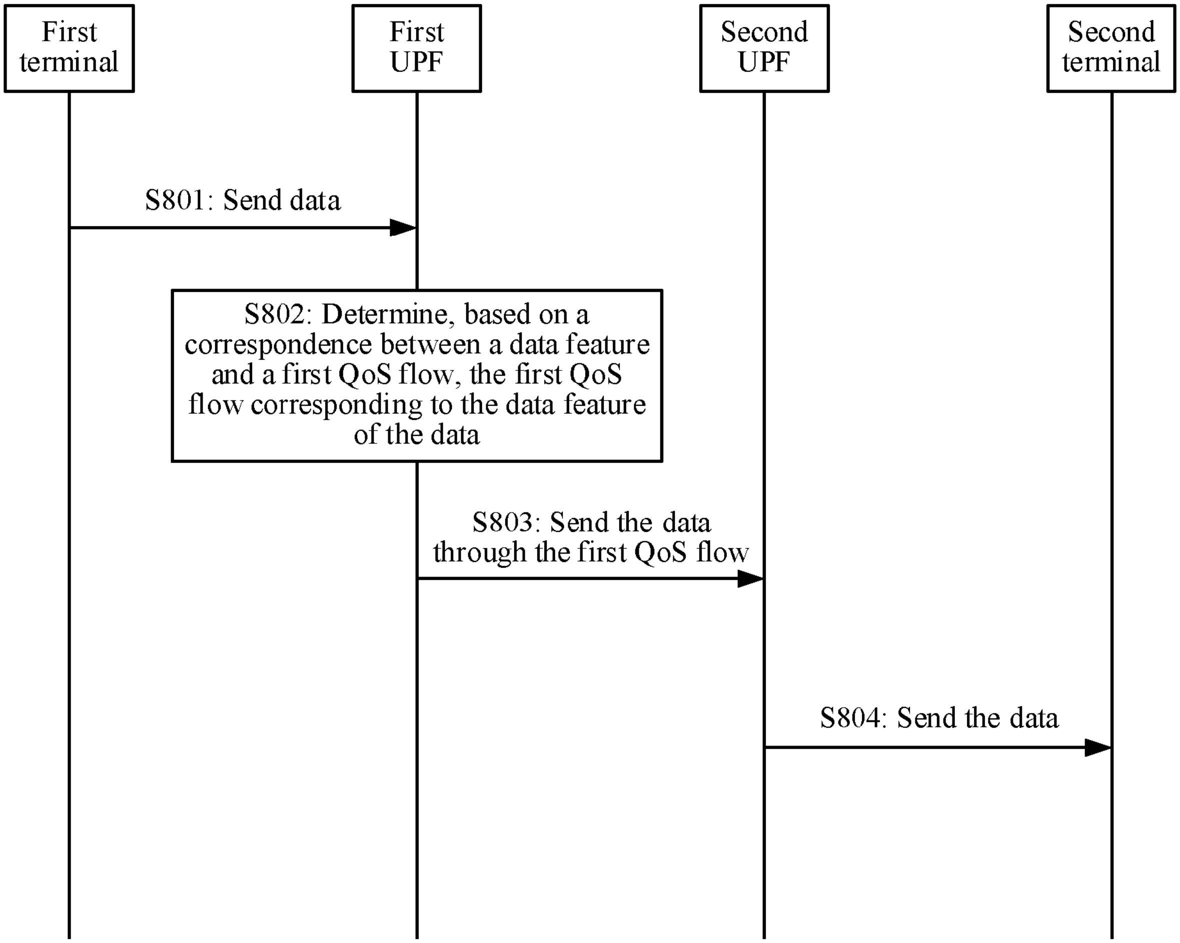
FIG. 8 is still another schematic flowchart of a data transmission method according to an embodiment of this application.

For example, an embodiment of this application further provides a data transmission method. FIG. 8 is still another schematic flowchart of a data transmission method according to an embodiment of this application. As shown in FIG. 8, the data transmission method may include S801 to S804. Data transmitted in S801 to S804 is service data sent by a first terminal to a second terminal.

S801: The first terminal sends data to a first UPF.

Correspondingly, the first UPF receives the data from the first terminal.

S802: The first UPF determines, based on a correspondence between a data feature of the data and a first QoS flow, the first QoS flow corresponding to the data feature.

For example, the data is a packet, and the data feature is a packet feature, for example, may be a 5-tuple of the packet, including an IP address, a source port, a destination IP address, a destination port, and a transport layer protocol.

In some embodiments, the correspondence between the data feature and the first QoS flow may also be configured by an SMF corresponding to the first UPF for the first UPF. For example, the first UPF may receive first configuration information from a first SMF. In this case, the first configuration information is for indicating the correspondence between the data feature and the first QoS flow.

Optionally, the first configuration information includes the data feature and identifier information of the first QoS flow corresponding to the data feature. The identifier information of the first QoS flow may be the foregoing QFI.

Optionally, the first configuration information further includes identifier information of the first interface, and the identifier information of the first interface is for indicating the first UPF to send the data to a second user plane function through the first QoS flow on the first interface corresponding to the identifier information of the first interface.

When the first configuration information does not include the identifier information of the first interface, the first UPF may send the identifier information of the first interface to the first interface according to a local policy. For example, different first interfaces have different link attributes, and the determined first QoS flow has a specific link attribute requirement. Therefore, the first UPF may send the identifier information of the first interface to a first interface that satisfies the link attribute requirement of the first QoS flow.

S803: The first UPF sends the data to the second UPF through the first QoS flow.

Correspondingly, the second UPF receives the data from the first UPF through the first QoS flow.

S804: The second UPF sends the data to the second terminal.

Correspondingly, the second terminal receives the data from the second UPF.

Optionally, in the embodiment shown in FIG. 8, when the first terminal sends the data to the first UPF, or when the second UPF sends the data to the second terminal, a corresponding second QoS flow or third QoS flow may be determined based on the data feature. Details are not described herein again.

It can be learned from the foregoing that, in the embodiment shown in FIG. 8, data transmission is performed between the first UPF and the second UPF through the first QoS flow corresponding to the data feature. Therefore, reliable QoS guarantee can be provided for a transmission path from the first UPF to the second UPF. However, data transmission between the first terminal and the first UPF and between the second UPF and the second terminal is also based on a QoS flow. Therefore, an entire transmission path from the first terminal to the second terminal can provide reliable QoS guarantee for data sent by the first terminal to the second terminal.

In addition, it should be noted that in the embodiment shown in FIG. 8, a specific method for configuring the first configuration information and the second configuration information is the same as or similar to a configuration rule for the PDR and the FAR in the embodiment shown in FIG. 6A, and details are not described again. For example, the data feature is configured in the PDR, and the identifier information of the first QoS flow corresponding to the data feature of the data is configured in the FAR.

Figure 9:
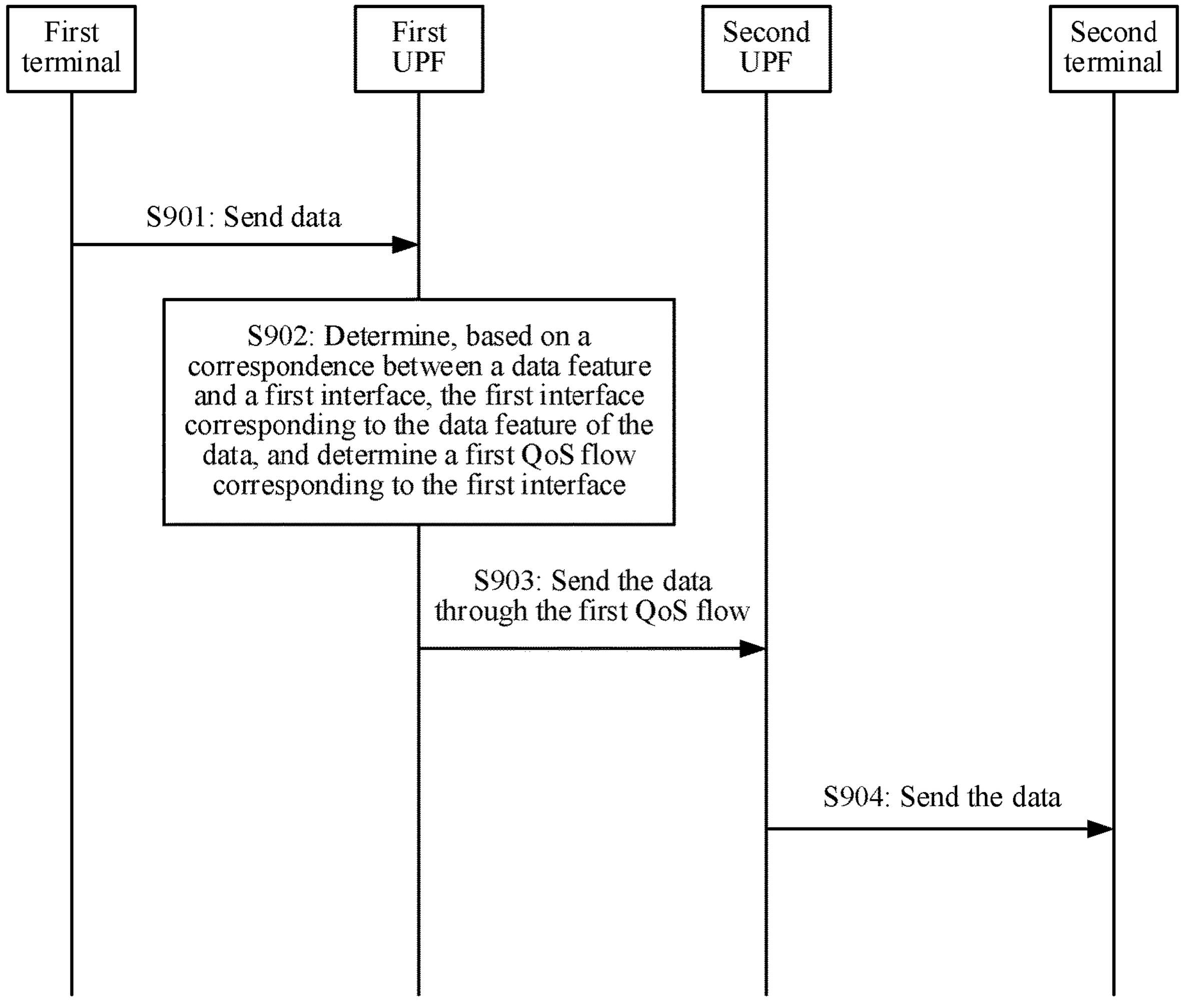
FIG. 9 is still another schematic flowchart of a data transmission method according to an embodiment of this application.

Different from the embodiment shown in FIG. 8, an embodiment of this application further provides a data transmission method. FIG. 9 is still another schematic flowchart of a data transmission method according to an embodiment of this application. As shown in FIG. 9, the data transmission method may include S901 to S904. Data transmitted in S901 to S904 is service data sent by a first terminal to a second terminal.

S901: The first terminal sends data to a first UPF.

Correspondingly, the first UPF receives the data from the first terminal.

S902: The first UPF determines, based on a correspondence between a data feature and a first interface, the first interface corresponding to the data feature of the data, and determines a first QoS flow corresponding to the first interface.

For the related description of the data feature, refer to the description in the embodiment shown in FIG. 8.

In some embodiments, the correspondence between the data feature and the first interface may also be configured by an SMF corresponding to the first UPF for the first UPF. For example, the first UPF may receive first configuration information from a first SMF. In this case, the first configuration information is for indicating the correspondence between the data feature and the first interface.

Optionally, the first configuration information includes the data feature and identifier information of the first interface corresponding to the data feature. The identifier information of the first interface may be an interface identifier of an N9 interface or the foregoing TEID of the GTP-U tunnel.

Because the determined first interface satisfies the data feature of the data, the first QoS flow corresponding to the first interface also satisfies the data feature of the data.

S903: The first UPF sends the data to the second UPF through the first QoS flow.

Correspondingly, the second UPF receives the data from the first UPF through the first QoS flow.

In other words, the second UPF may receive the data from the first UPF on the determined first interface through the first QoS flow.

S904: The second UPF sends the data to the second terminal.

Correspondingly, the second terminal receives the data from the second UPF.

Optionally, in the embodiment shown in FIG. 9, when the first terminal sends the data to the first UPF, or when the second UPF sends the data to the second terminal, a corresponding second QoS flow or third QoS flow may be determined based on the data feature. Details are not described herein again either.

It can be learned from the foregoing that, in the embodiment shown in FIG. 9, data transmission is performed between the first UPF and the second UPF through the first QoS flow on the first interface corresponding to the data feature. Therefore, reliable QoS guarantee can also be provided for a transmission path from the first UPF to the second UPF. However, data transmission between the first terminal and the first UPF and between the second UPF and the second terminal is also based on a QoS flow. Therefore, an entire transmission path from the first terminal to the second terminal can also provide reliable QoS guarantee for data sent by the first terminal to the second terminal.

In addition, it should be noted that in the embodiment shown in FIG. 9, a specific method for configuring the first configuration information and the second configuration information is the same as or similar to a configuration rule for the PDR and the FAR in the embodiment shown in FIG. 6A, and details are not described again either.

With reference to FIG. 8 and FIG. 9, it can be learned that in embodiments of this application, the data feature includes a QoS requirement (for example, a delay requirement) for data transmission, and the first UPF may determine, based on the QoS requirement of the data and link quality of the first interface and/or the QoS flow, the first interface and/or the first QoS flow for data forwarding.

Optionally, in the embodiments shown in FIG. 8 and/or FIG. 9, the data sent by the first terminal to the second terminal may also include a user tunnel identifier, where the user tunnel identifier is the same as that described in the foregoing embodiment, and is not described herein again.

It may be understood that, although the data transmission method described in the embodiments shown in FIG. 6A to FIG. 9 in this application is described by using a process in which the first terminal sends data to the second terminal, the data transmission method may also be extended to a process in which the second terminal sends data to the first terminal. In other words, the data transmission method in this application is applicable to a process of transmission of service data between any two terminals. According to the data transmission method, a forwarding path between UPFs that serve a user can be created, and service data is forwarded, based on a QoS requirement of the user by using an appropriate forwarding path, to a UPF that serves a peer user.

In addition, the data transmission method provided in embodiments of this application may also be extended to end-to-end transmission in a wide area network scenario. Currently, end-to-end transmission in WAN scenarios is implemented based on the software-defined wide area network (SD-WAN) technology. The SD-WAN is a service that applies a software-defined network (SDN) technology to a wide area network scenario. This service connects enterprise networks, data centers, internet applications, and cloud services across a broad geographical area, aiming to reduce the expenditure of wide area networks and improve the flexibility of network connection. The SD-WAN is cost-effective and easy to use, and supports scalable deployment and reliable security.

Figure 10:
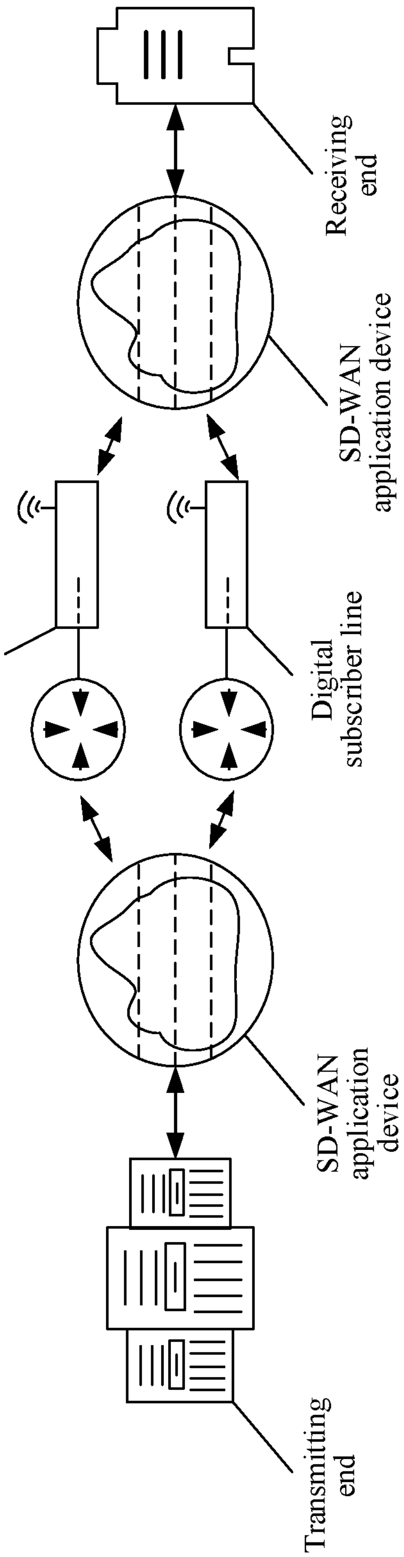
FIG. 10 is a schematic composition diagram of a system for end-to-end transmission in a wide area network scenario.

FIG. 10 is a schematic composition diagram of a system for end-to-end transmission in a wide area network scenario. As shown in FIG. 10, the SD-WAN is implemented through a tunnel. A plurality of links, for example, a wired link (cable) and a digital subscriber line (DSL), are included between an SD-WAN application device at a transmitting end and an SD-WAN application device at a receiving end. The SD-WAN application device at the transmitting end may obtain link quality information such as a delay, a packet loss rate, and a jitter of each link through frequent link quality detection, to send user service data at the transmitting end to the SD-WAN application device at the receiving end through different links based on service requirements and the link quality information. The SD-WAN application device at the receiving end may forward the received user service data to the receiving end.

However, in the foregoing process of end-to-end transmission in the wide area network scenario based on an SD-WAN technology, link quality guarantee can be provided only for a transmission link between the SD-WAN application device at the transmit end and the SD-WAN application device at the receiving end, and reliable end-to-end wide area link quality guarantee cannot be provided for an entire link from the transmit end to the receiving end.

However, in the data transmission method provided in embodiments of this application, a transmission path from the first UPF to the second UPF may replace a transmission link between the SD-WAN application device at the transmit end and the SD-WAN application device at the receiving end in the wide area network scenario based on the SD-WAN technology, to provide reliable end-to-end wide area link quality guarantee for the entire link from the transmit end to the receiving end. In addition, in a forwarding process, instead of sensing a destination address in a packet, a UPF may forward the packet based on a correspondence between a session and a flow, thereby reducing a forwarding requirement on the UPF, and a quantity of user addresses is not limited, thereby improving flexibility of network deployment on a user side. In addition, compared with the SD-WAN, in the data transmission method provided in embodiments of this application, the terminal does not need to implement a tunneling protocol.

Optionally, in embodiments of this application, the first terminal may further initiate link quality detection to the second terminal, to obtain link quality of an end-to-end forwarding path created in the foregoing embodiments, so that the first terminal can determine, based on the detected link quality, a QoS flow for distributing a packet.

For example, in a possible design, data sent by the first terminal to the second terminal includes a link detection indication. When receiving the data, the first UPF may insert first detection information into the data based on the link detection indication. The first detection information may be included in a GTP-U header, or may be included in a GTP-U upper layer. The first detection information includes one or more of information such as uplink bandwidth, downlink bandwidth, uplink packet loss statistics (packet loss rate), downlink packet loss statistics (packet loss rate), a timestamp at which a packet is received, a timestamp at which a packet is sent, and an uplink/downlink air interface delay of the first terminal that correspond to a QoS flow in a transmission path from the first terminal to the first UPF.

It may be understood that in this case, when the second UPF receives the data, the data includes the first detection information and the link detection indication. When receiving the data, the second UPF may insert second detection information into the data based on the link detection indication. Similar to the first detection information, the second detection information may include one or more of information such as uplink bandwidth, downlink bandwidth, uplink packet loss statistics (packet loss rate), downlink packet loss statistics (packet loss rate), a timestamp at which a packet is received, a timestamp at which a packet is sent, and an uplink/downlink air interface delay of the first terminal that correspond to a QoS flow in a transmission path from the first UPF to the second UPF. A type of the second detection information may be the same as or different from a type of the first detection information.

In other words, the link detection indication is for indicating the first UPF to insert the first detection information into the data, and indicating the second UPF to insert the second detection information into the data.

When the second UPF forwards the data to the second terminal, the second terminal may determine link quality information of an entire transmission path from the first terminal to the second terminal with reference to third detection information that is on a transmission path from the second UPF to the second terminal and that is learned by the second terminal and the first detection information and the second detection information that are included in the data. Then, the second terminal may return the link quality information of the entire transmission path from the first terminal to the second terminal to the first terminal, so that the first terminal can determine, based on the link quality information of the entire transmission path from the first terminal to the second terminal, a QoS flow for sending the data packet to the second terminal.

Figure 11:
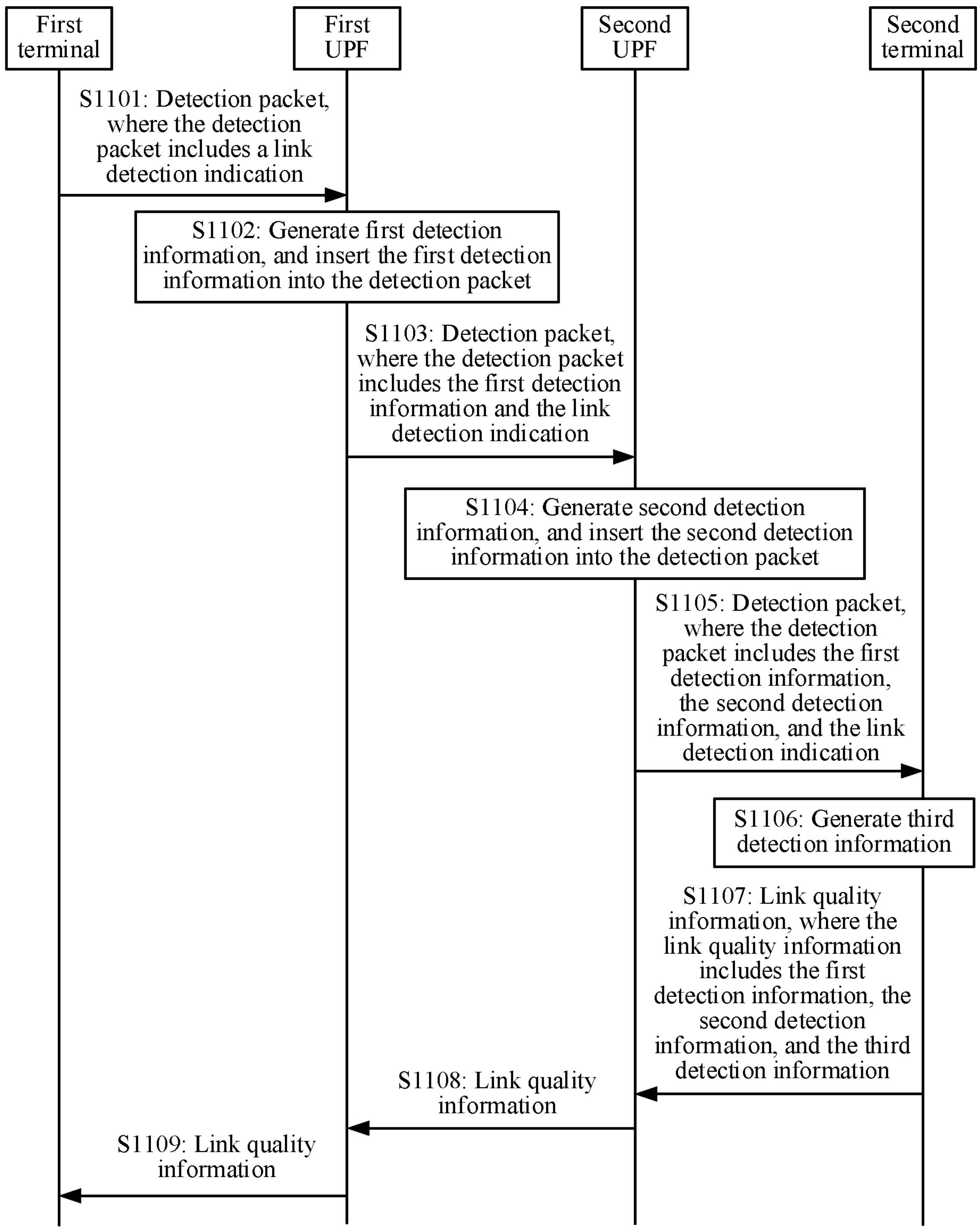
FIG. 11 is a schematic flowchart of a link quality detection method according to an embodiment of this application.

In another possible design, the first terminal may alternatively separately send the link detection indication to the second terminal by using a detection packet. For example, the link detection indication may be carried in the detection packet. For example, an embodiment of this application further provides a link quality detection method. FIG. 11 is a schematic flowchart of a link quality detection method according to an embodiment of this application. As shown in FIG. 11, the link quality detection method may include S1101 to S1109. S101 to S1109 are a process in which a first terminal sends a link detection indication to a second terminal and receives the link detection indication returned by the second terminal.

S1101: The first terminal sends a detection packet to a first UPF, where the detection packet includes the link detection indication.

Correspondingly, the first UPF receives the detection packet from the first terminal.

S1102: The first UPF generates first detection information, and inserts the first detection information into the detection packet.

S1103: The first UPF sends the detection packet to a second UPF, where the detection packet includes the first detection information and the link detection indication.

Correspondingly, the second UPF receives the detection packet from the first UPF.

S1104: The second UPF generates second detection information, and inserts the second detection information into the detection packet.

S1105: The second UPF sends the detection packet to the second terminal, where the detection packet includes the first detection information, the second detection information, and the link detection indication.

Correspondingly, the second terminal receives the detection packet from the second UPF.

S1106: The second terminal generates third detection information.

S1107: The second terminal sends link quality information to the second UPF, where the link quality information includes the first detection information, the second detection information, and the third detection information.

The link quality information is link quality information of a transmission path from the first terminal to the second terminal. The first detection information is link quality information of a transmission path from the first terminal to the first UPF, the second detection information is link quality information of a transmission path from the first UPF to the second UPF, and the third detection information is link quality information of a transmission path from the second UPF to the second terminal.

Correspondingly, the second UPF receives the link quality information.

S1108: The second UPF sends the link quality information to the first UPF.

Correspondingly, the first UPF receives the link quality information.

S1109: The first UPF sends the link quality information to the first terminal.

Correspondingly, the first terminal receives the link quality information.

In an implementation, the link detection indication is specifically for indicating to detect link quality information of a QoS flow that carries the link detection indication and that is in the transmission path from the first terminal to the second terminal. In other words, if a QoS flow is used to carry the detection packet including the link detection indication, the link detection indication is specifically for indicating link quality information of the corresponding QoS flow.

In another implementation, the link detection indication includes identifier information of one or more QoS flows. In this case, the link quality information is specifically for indicating link quality information that is of the QoS flow and that corresponds to the identifier information of the QoS flow included in the link detection indication.

Optionally, in embodiments of this application, the first terminal and the second terminal may periodically (for example, the periodicity may be 5 ms, 10 ms, or 100 ms, which is not limited herein) send link detection indications to each other, so that both the first terminal and the second terminal can obtain link quality information from a local end to a peer end terminal (for example, if the first terminal is the local end, the second terminal is the peer end terminal)

within a one-way delay. When sending the link detection indication, the first terminal and the second terminal may further send, in the link detection indication, link quality information received from the peer end terminal last time, so that the peer end terminal obtains more accurate link quality information (for example, the foregoing delay information). For example, the first terminal sends the link detection indication to the second terminal, and sends, to the second terminal, link quality information of a transmission path from the second terminal to the first terminal.

In some embodiments, different types of link quality information may also be obtained in different processes. For example, a delay is first obtained in one detection process, and then delay information and available bandwidth information are inserted in a next detection process, to ensure accuracy of delay detection.

In a possible design, the link quality detection method further includes: determining, by the first terminal based on the link quality information of the transmission path from the first terminal to the second terminal and a quality of service requirement of data that needs to be sent to the second terminal, a quality of service flow that carries the data. For example, the first terminal may determine detected link quality based on the link quality information of the transmission path from the first terminal to the second terminal. Then, the first terminal may determine, based on a QoS requirement of data that needs to be sent to the second terminal and detected link quality, a QoS flow for distributing data (for example, a packet).

Optionally, in embodiments of this application, a manner of obtaining the link quality when the terminal determines, based on the link quality of the QoS flow, the QoS flow used for sending the packet is not limited. For example, the link quality may be obtained in a manner of link quality detection described in the foregoing embodiment, or may be obtained from a control plane when a flow is created, which is not limited herein.

The foregoing embodiment shown in FIG. 11 is a process in which the first terminal initiates link quality detection, and link quality of the transmission path from the first terminal to the second terminal is detected. Similarly, the second terminal may also initiate a link quality detection process, and correspondingly, link quality of the transmission path from the second terminal to the first terminal is detected.

In some other possible designs, a link quality detection process may also be initiated by the first UPF or the second UPF.

For example, the first UPF may send a first link detection request to the first terminal, and the first terminal may return link quality information of a transmission path from the first UPF to the first terminal to the first UPF based on the first link detection request. Correspondingly, the first UPF receives, from the first terminal, the link quality information of the transmission path from the first UPF to the first terminal. The second UPF may send a second link detection request to the first UPF. Correspondingly, the first UPF receives the second link detection request from the second UPF. Then, the first UPF may return the link quality information of the transmission path from the first UPF to the first terminal and link quality information of a transmission path from the second UPF to the first UPF to the second UPF based on the second link detection request. In this case, the second UPF can learn the link quality information of the transmission path from the second UPF to the first terminal. Because the second UPF can further easily learn the link quality information of the transmission path from the second terminal to the second UPF, the second UPF may determine the link quality information of the transmission path from the second terminal to the first terminal, and return the link quality information to the terminal, so that the second terminal can obtain the link quality information of the transmission path from the second terminal to the first terminal. In this way, the second terminal may determine, based on the link quality information of the entire transmission path from the second terminal to the first terminal, a QoS flow for sending a data packet to the first terminal.

Similarly, the first UPF may also obtain the link quality information of the transmission path from the first terminal to the second terminal, and send the link quality information to the first terminal, so that the first terminal may determine, based on the link quality information of the entire transmission path from the first terminal to the second terminal, a QoS flow for sending a data packet to the second terminal.

For example, the first UPF may send a link detection request to the second UPF, to request to obtain link quality information of a transmission path from the first UPF to the second terminal. The link detection request may be referred to as a third link detection request. The link quality information of the transmission path from the first UPF to the second terminal includes link quality information that is of the transmission path from the first UPF to the second UPF and that is generated by the second UPF, and link quality information that is of the transmission path from the second UPF to the second terminal and that is sent by the second terminal to the second UPF. For the sending, by the second terminal, the link quality information of the transmission path from the second UPF to the second terminal to the second UPF, refer to the foregoing process in which the first terminal sends the link quality information of the transmission path from the first UPF to the first terminal to the first UPF. For example, the second UPF may send a fourth link detection request to the second terminal, and the second terminal may return the link quality information of the transmission path from the second UPF to the second terminal to the second UPF. In addition, the first UPF may obtain the link quality information of the transmission path from the first terminal to the first UPF. Therefore, the first UPF may obtain the link quality information of the transmission path from the first terminal to the second terminal. The first UPF may send the obtained link quality information of the transmission path from the first terminal to the second terminal to the first terminal, so that the first terminal may determine, based on the link quality information of the entire transmission path from the first terminal to the second terminal, a QoS flow for sending a packet to the second terminal.

Figure 12:
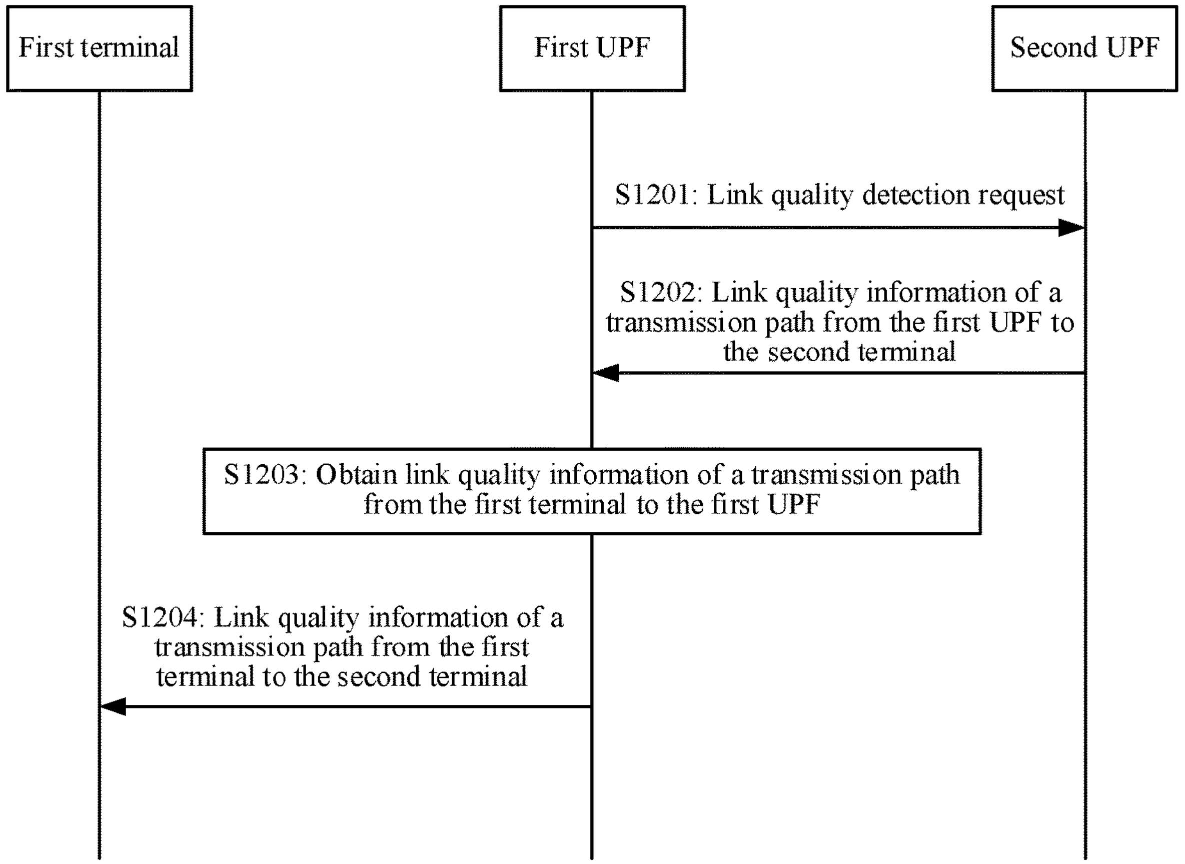
FIG. 12 is another schematic flowchart of a link quality detection method according to an embodiment of this application.

For example, a first UPF obtains link quality information of a transmission path from a first terminal to a second terminal, and sends the link quality information to the first terminal. FIG. 12 is another schematic flowchart of a link quality detection method according to an embodiment of this application. As shown in FIG. 12, the link quality detection method may include S1201 to S1204.

S1201: The first UPF sends a link quality detection request to a second UPF.

The link quality detection request sent by the first UPF to the second UPF is the third link detection request mentioned above.

Correspondingly, the second UPF receives the link quality detection request.

S1202: The second UPF sends link quality information of a transmission path from the first UPF to the second terminal to the first UPF.

Correspondingly, the first UPF receives the link quality information of the transmission path from the first UPF to the second terminal.

S1203: The first UPF obtains link quality information of a transmission path from the first terminal to the first UPF.

In this case, the first UPF may obtain link quality information of a transmission path from the first terminal to the second terminal based on link quality information of a transmission path from the first UPF to the second UPF, the link quality information of the transmission path from the first terminal to the first UPF, and link quality information of a transmission path from the second UPF to the second terminal.

S1204: The first UPF sends the link quality information of the transmission path from the first terminal to the second terminal to the first terminal.

Correspondingly, the first terminal receives the link quality information of the transmission path from the first terminal to the second terminal.

For the link quality information mentioned in the embodiment shown in FIG. 12, refer to a type of the first detection information or the like in the embodiment shown in FIG. 11. Details are not described herein again.

Optionally, in the embodiments shown in FIG. 11 and/or FIG. 12, when the first terminal accesses a core network by using an access network device, the link quality information of the transmission path from the first terminal to the first UPF includes link quality information of a transmission path from the first terminal to an access network device of the first terminal and link quality information of a transmission path from the access network device of the first terminal to the first UPF; and/or when the second terminal accesses a core network by using an access network device, the link quality information of the transmission path from the second UPF to the second terminal includes link quality information of a transmission path from the second UPF to an access network device of the second terminal and link quality information of a transmission path from an access network device of the second terminal to the second terminal.

For example, in the embodiment shown in FIG. 11, when the first terminal accesses a core network by using an access network device, and data sent by the first terminal and received by the access network device of the first terminal includes a link quality detection indication, detection information of a transmission path from the first terminal to the access network device of the first terminal is inserted once, which is referred to as fourth detection information. When receiving the data forwarded by the access network device of the first terminal, the first UPF inserts detection information from the access network device of the first terminal to the first UPF once, which is referred to as fifth detection information. In other words, the first detection information includes the fourth detection information and the fifth detection information.

Optionally, if both the third detection information and the fourth detection information include uplink bandwidth information, and the uplink bandwidth information in the fourth detection information is less than the uplink bandwidth information in the third detection information, only the uplink bandwidth information in the fourth detection information is retained.

As described above, in embodiments of this application, the first UPF may obtain the link quality information of the transmission path from the first terminal to the second terminal. The determining, by the first SMF, a correspondence between the second QoS flow and the first QoS flow or the first interface, or determining a correspondence between a data feature and the first QoS flow or the first interface mentioned in the foregoing embodiment may be: after the link quality information of the transmission path from the first terminal to the second terminal is obtained, sending, by the first UPF, the link quality information to a control plane network element (for example, the first SMF), and determining, by the control plane network element, the correspondence based on the link quality information. For example, after obtaining the link quality information of the transmission path from the first terminal to the second terminal, the first UPF may send the link quality information to the first SMF. The first SMF may determine, based on the QoS requirement of the data, the first QoS flow used when the first UPF forwards the data to the second UPF, and configure a correspondence between the second QoS flow and the first QoS flow between the first terminal and the first UPF to the first UPF. Alternatively, the correspondence between the data feature and the first QoS flow is configured to the first UPF, or the like.

In some other embodiments, when the first UPF sends a link detection request (for example, the third link detection request) to the second UPF, the second UPF may return link quality information to the first UPF, including a timestamp at which the second UPF receives the link detection request and a timestamp at which the second UPF sends the link quality information. For example, the first UPF may send the detection packet to the second UPF through the first interface, and the first UPF may insert the link detection request into the detection packet. The second UPF then sends the link quality information to the first UPF, including a timestamp at which the second UPF receives the detection packet (that is, a timestamp at which the link detection request is received) and a timestamp at which the second UPF sends the link quality information. The first UPF may determine link quality of a transmission path from the first UPF to the second UPF based on the received link quality information. For example, the first UPF may determine a link delay of the transmission path from the first UPF to the second UPF based on the timestamp at which the second UPF receives the detection packet and the timestamp at which the second UPF sends the link quality information. The link delay is the link quality. For example, if the timestamp at which the second UPF receives the detection packet is 5 ms earlier than the timestamp at which the second UPF sends the link quality information, the first UPF may determine that the link delay of the transmission path from the first UPF to the second UPF is 5 ms. Certainly, it may be understood that 5 ms is merely an example for description.

Then, the first UPF and the control plane network element (for example, the first SMF) may determine a maximum delay from the first terminal to the second terminal based on a maximum delay budget from the first terminal to the first UPF, link quality from the first UPF to the second UPF, and a maximum delay budget from the second UPF to the second terminal, to determine a first QoS flow for distributing a packet when the first UPF forwards data to the second UPF. Alternatively, when it is determined that data is forwarded between another terminal and the terminal, the first interface between the first UPF and the second UPF and/or the first QoS flow are/is used to forward a data packet.

Similarly, when the second UPF may send the link detection request to the first UPF, the first UPF may return the link quality information to the second UPF, including a timestamp at which the first UPF receives the link detection request and a timestamp at which the first UPF sends the link quality information. The second UPF may determine link quality of a transmission path from the second UPF to the first UPF based on the timestamp at which the first UPF receives the link detection request and the timestamp at which the first UPF sends the link quality information. Then, the second UPF and the control plane network element (for example, the second SMF) may determine a maximum delay from the second terminal to the first terminal based on a maximum delay budget from the second terminal to the second UPF, link quality from the second UPF to the first UPF, and a maximum delay budget from the first UPF to the first terminal, to determine a first QoS flow for distributing a packet when the second UPF forwards data to the first UPF.

The foregoing mainly describes the solutions provided in embodiments of this application from a perspective of interaction between network elements. It may be understood that, to implement the foregoing functions, each network element such as a first user plane network element, the second user plane network element, a first terminal, or a second terminal includes a corresponding hardware structure and/or software module for performing each function.

Figure 13:
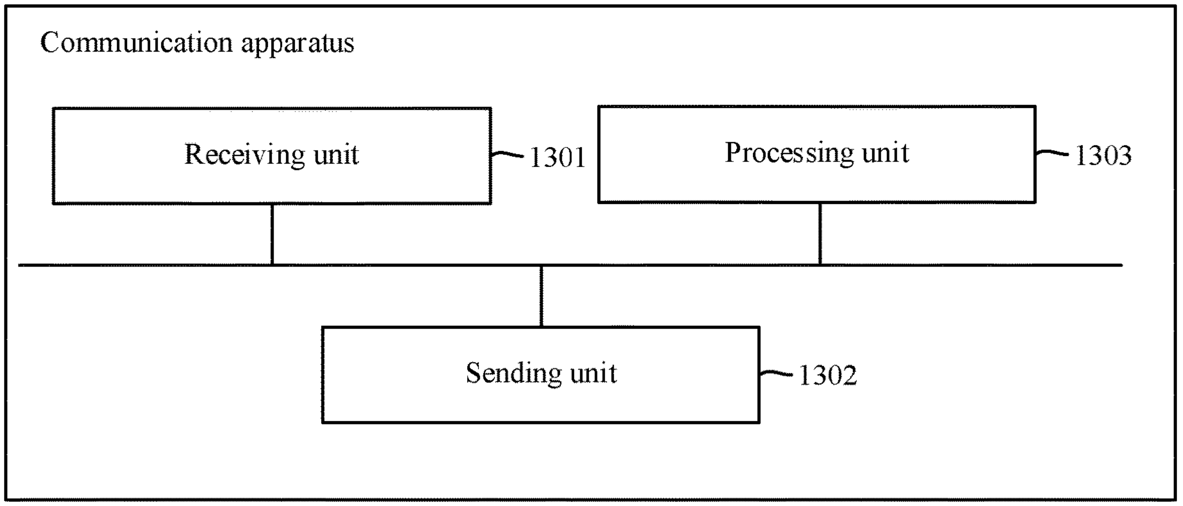
FIG. 13 is a schematic diagram of a structure of a communication apparatus according to an embodiment of this application.

For example, an embodiment of this application may further provide a communication apparatus that may be applied to a first user plane function. FIG. 13 is a schematic diagram of a structure of a communication apparatus according to an embodiment of this application. As shown in FIG. 13, the communication apparatus includes a receiving unit 1301 and a sending unit 1302.

The receiving unit 1301 is configured to receive data from a first terminal, where the data is data sent to a second terminal. The sending unit 1302 is configured to send the data to a second user plane function through a first QoS, where the second user plane function is a user plane function corresponding to the second terminal.

In a possible design, the data includes a link detection indication, and the link detection indication is for indicating the sending unit 1302 to insert link quality information of a transmission path from the first terminal to the first user plane function or link quality information of a transmission path from an access network device of the first terminal to the first user plane function into the data based on the link detection indication.

In a possible design, the sending unit 1302 is further configured to send a first link detection request to the first terminal; and the receiving unit 1301 is further configured to receive, from the first terminal, link quality information of a transmission path from the first user plane function to the first terminal.

In a possible design, the receiving unit 1301 is further configured to receive a second link detection request from a second user plane function; and the sending unit 1302 is further configured to send, to the second user plane function, the link quality information of the transmission path from the first user plane function to the first terminal and link quality information of a transmission path from the second user plane function to the first user plane function.

In a possible design, the sending unit 1302 is further configured to send a third link detection request to the second user plane function; the receiving unit 1301 is further configured to receive link quality information of a transmission path from the first user plane function to the second user plane function and link quality information of a transmission path from the second user plane function to a second terminal from the second user plane function; and the sending unit 1302 is further configured to send, to the first terminal, link quality information of a transmission path from the first terminal to the first user plane function, the link quality information of the transmission path from the first user plane function to the second user plane function, and the link quality information of the transmission path from the second user plane function to the second terminal.

Still referring to FIG. 13, in a possible design, the link quality information of the transmission path from the first user plane function to the second user plane function includes a timestamp at which the second user plane function receives the third link detection request and a timestamp at which the second user plane function sends the link quality information. The apparatus further includes: a processing unit 1303, configured to determine link quality of the transmission path from the first user plane function to the second user plane function based on the link quality information.

Still referring to FIG. 13, in a possible design, the receiving unit 1301 is specifically configured to receive the data from the first terminal through a second QoS flow; and the apparatus further includes: the processing unit 1303, configured to determine, based on a correspondence between the second QoS flow and the first QoS flow, the first QoS flow corresponding to the second QoS flow. The correspondence between the second QoS flow and the first QoS flow is determined based on a QoS requirement that can be satisfied by the second QoS flow and a QoS requirement that can be satisfied by the first QoS flow.

In a possible design, the receiving unit 1301 is further configured to receive first configuration information from a first session management function, where the first configuration information is for indicating the correspondence between the second QoS flow and the first QoS flow.

In a possible design, the first configuration information includes identifier information of the second QoS flow and identifier information of the first QoS flow corresponding to the second QoS flow.

In a possible design, the first configuration information further includes identifier information of a first interface, and the first configuration information is for indicating the sending unit 1302 to send the data to the second user plane function on the first interface through the first QoS flow.

In a possible design, the second QoS flow and the first QoS flow have the same identifier information.

In another possible design, the receiving unit 1301 is specifically configured to receive the data from the first terminal through a second QoS flow; and the processing unit 1303 is configured to: determine, based on a correspondence between the second QoS flow and the first interface, the first interface corresponding to the second QoS flow, and determine the first QoS flow corresponding to the first interface, where the correspondence between the second QoS flow and the first interface is determined based on a QoS requirement that can be satisfied by the second QoS flow and a QoS requirement that can be satisfied by the first interface.

In a possible design, the receiving unit 1301 is further configured to receive first configuration information from a first session management function, where the first configuration information is for indicating the correspondence between the second QoS flow and the first interface.

In a possible design, the first configuration information includes identifier information of the second QoS flow and identifier information of the first interface corresponding to the second QoS flow.

In still another possible design, the processing unit 1303 is configured to determine, based on a correspondence between a data feature and the first QoS flow, the first QoS flow corresponding to the data feature.

In a possible design, the receiving unit 1301 is further configured to receive first configuration information from a first session management function, where the first configuration information is for indicating the correspondence between the data feature and the first QoS flow.

In a possible design, the first configuration information includes the data feature and identifier information of the first QoS flow corresponding to the data feature.

In a possible design, the first configuration information further includes identifier information of a first interface, and the first configuration information is for indicating the sending unit 1302 to send the data to the second user plane function on the first interface through the first QoS flow.

In still another possible design, the processing unit 1303 is configured to: determine, based on a correspondence between the data feature and the first interface, the first interface corresponding to the data feature of the data, and determine the first QoS flow corresponding to the first interface.

In a possible design, the receiving unit 1301 is further configured to receive first configuration information from a first session management function, where the first configuration information is for indicating the correspondence between the data feature and the first interface.

In a possible design, the first configuration information includes the data feature and identifier information of the first interface corresponding to the data feature.

In a possible design, the data includes a user tunnel identifier, and the user tunnel identifier is for indicating that the data is data sent by the first terminal to the second terminal.

Figure 14:
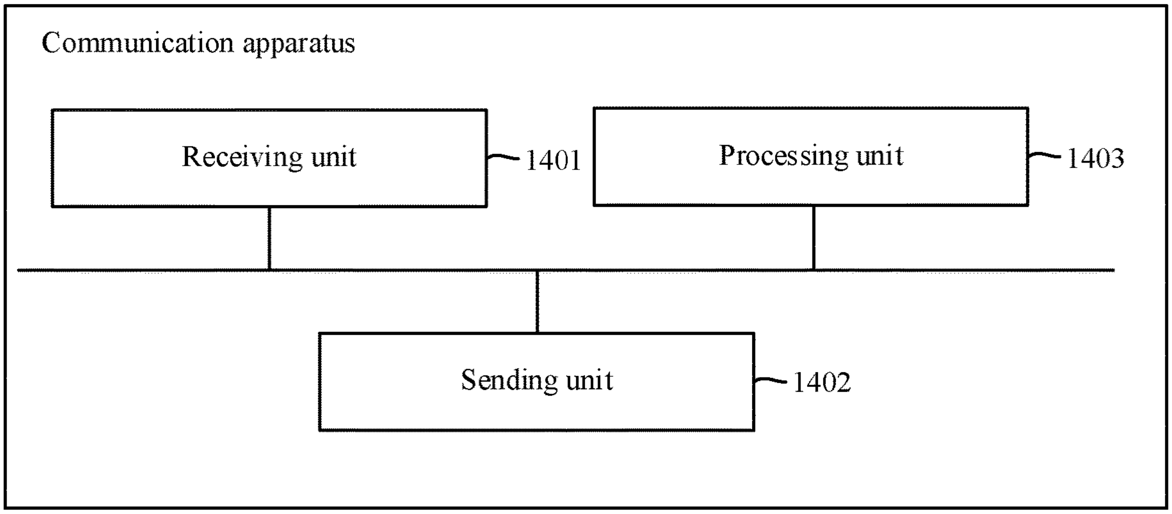
FIG. 14 is another schematic diagram of a structure of a communication apparatus according to an embodiment of this application.

An embodiment of this application further provides a communication apparatus applied to a second user plane network element. FIG. 14 is another schematic diagram of a structure of a communication apparatus according to an embodiment of this application. As shown in FIG. 14, the communication apparatus includes a receiving unit 1401 and a sending unit 1402.

The receiving unit 1401 is configured to receive data from a first user plane function through a first QoS flow, where the first user plane function is a user plane function corresponding to a first terminal, and the data is data sent to a second terminal. The sending unit 1402 is configured to send the data to the second terminal.

In a possible design, the data includes a link detection indication, and the link detection indication is for indicating the sending unit 1402 to insert link quality information of a transmission path from the first user plane function to a second user plane function into the data based on the link detection indication.

In a possible design, the sending unit 1402 is further configured to send a second link detection request to the first user plane function; the receiving unit 1401 is further configured to receive link quality information of a transmission path from the first user plane function to the first terminal and link quality information of a transmission path from the second user plane function to the first user plane function from the first user plane function; and the sending unit 1402 is further configured to send the link quality information of the transmission path from the first user plane function to the first terminal to the second terminal, the link quality information of the transmission path from the second user plane function to the first user plane function, and link quality information of a transmission path from the second terminal to the second user plane function.

In a possible design, the receiving unit 1401 is further configured to receive a third link detection request from the first user plane function; and the sending unit 1402 is further configured to send the link quality information of the transmission path from the first user plane function to the second user plane function and link quality information of a transmission path from the second user plane function to the second terminal to the first user plane function.

In a possible design, the sending unit 1402 is further configured to send a fourth link detection request to the second terminal; and the receiving unit 1401 is further configured to receive the link quality information of the transmission path from the second user plane function to the second terminal from the second terminal.

Still referring to FIG. 14, in a possible design, the sending unit 1402 is further configured to send a link detection request to the first user plane function; the receiving unit 1401 is further configured to receive link quality information from the first user plane function, where the link quality information includes a timestamp at which the first user plane function receives the link detection request and a timestamp at which the first user plane function sends the link quality information; and the apparatus further includes a processing unit 1403, configured to determine link quality of the transmission path from the second user plane function to the first user plane function based on the link quality information.

Still referring to FIG. 14, in a possible design, the sending unit 1402 is specifically configured to send the data to the second terminal through a third QoS flow; and the apparatus further includes a processing unit 1403, configured to determine, based on a correspondence between the first QoS flow and the third QoS flow, the third QoS flow corresponding to the first QoS flow. The correspondence between the first QoS flow and the third QoS flow is determined based on the QoS requirement that can be satisfied by the first QoS flow and a QoS requirement that can be satisfied by the third QoS flow.

In a possible design, the receiving unit is further configured to receive second configuration information from a second session management function, where the second configuration information is for indicating the correspondence between the first QoS flow and the third QoS flow.

In a possible design, the second configuration information includes the identifier information of the first QoS flow and identifier information of the third QoS flow corresponding to the first QoS flow.

In a possible design, the identifier information of the first QoS flow is the same as that of the third QoS flow.

In another possible design, the receiving unit 1401 is specifically configured to receive the data from the first user plane function on the first interface through the first QoS flow; the sending unit 1402 is specifically configured to send the data to the second terminal through the third QoS flow; and the processing unit 1403 is configured to determine, based on a correspondence between the first interface and the third QoS flow, the third QoS flow corresponding to the first interface. The correspondence between the first interface and the third QoS flow is determined based on the QoS requirement that can be satisfied by the first interface and a QoS requirement that can be satisfied by the third QoS flow.

In a possible design, the receiving unit 1401 is further configured to receive second configuration information from the second session management function, where the second configuration information is for indicating the correspondence between the first interface and the third QoS flow.

In a possible design, the second configuration information includes identifier information of the first interface and the identifier information of the third QoS flow corresponding to the first interface.

In a possible design, the data includes a user tunnel identifier, and the user tunnel identifier is for indicating that the data is data sent by the first terminal to the second terminal.

Figure 15:
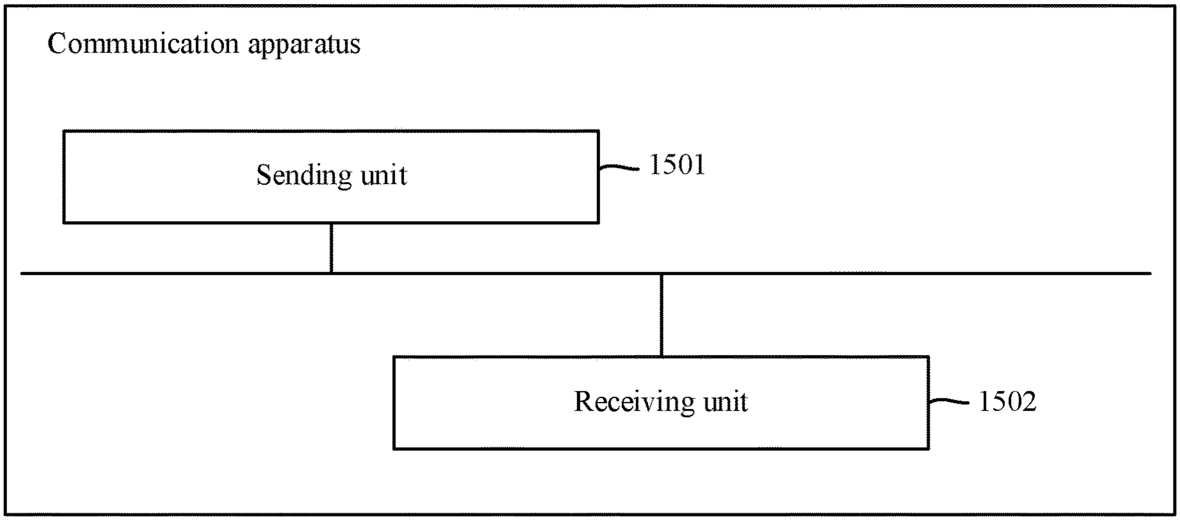
FIG. 15 is still another schematic diagram of a structure of a communication apparatus according to an embodiment of this application.

Optionally, an embodiment of this application further provides a communication apparatus applied to a first terminal. FIG. 15 is still another schematic diagram of a structure of a communication apparatus according to an embodiment of this application. As shown in FIG. 15, the communication apparatus includes a sending unit 1501 and a receiving unit 1502.

The sending unit 1501 is configured to send, to a second terminal, a link detection indication and link quality information of a transmission path from the second terminal to a first terminal. The receiving unit 1502 is configured to receive, from the second terminal, link quality information of a transmission path from the first terminal to the second terminal.

In a possible design, the link quality information of the transmission path from the first terminal to the second terminal includes: link quality information of a transmission path from the first terminal to a first user plane function, link quality information of a transmission path from the first user plane function to a second user plane function, and link quality information of a transmission path from the second user plane function to the second terminal.

In a possible design, the link quality information of the transmission path from the first terminal to the first user plane function includes link quality information of a transmission path from the first terminal to an access network device of the first terminal and link quality information of a transmission path from the access network device of the first terminal to the first user plane function.

In a possible design, the link quality information of the transmission path from the second user plane function to the second terminal includes link quality information of a transmission path from the second user plane function to an access network device of the second terminal and link quality information of a transmission path from the access network device of the second terminal to the second terminal.

In a possible design, the link detection indication is specifically for indicating to detect link quality information of a QoS flow that carries the link detection indication and that is in the transmission path from the first terminal to the second terminal.

In another possible design, the link detection indication includes identifier information of one or more QoS flows.

In some other possible designs, the communication apparatus further includes a processing unit (not shown in the figure), configured to determine, based on the link quality information of the transmission path from the first terminal to the second terminal and a quality of service requirement of data that needs to be sent to the second terminal, a quality of service flow that carries the data.

Similarly, the second terminal also has an apparatus similar to that of the first terminal, and is configured to implement a function of sending, by the second terminal, the link detection indication to the first terminal, to obtain link quality information of a transmission path from the second terminal to the first terminal. Details are not described herein again.

Figure 16:
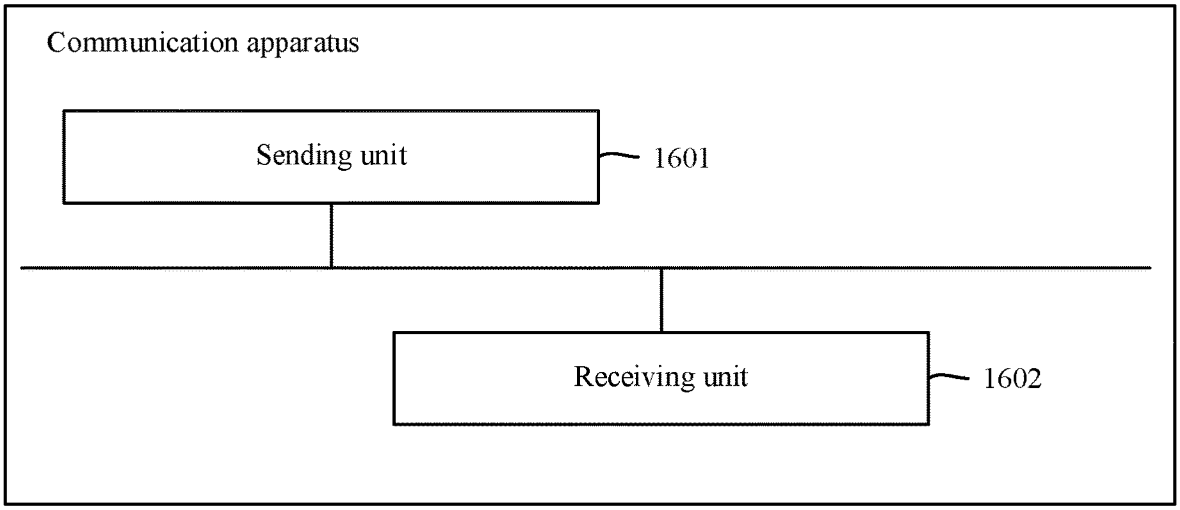
FIG. 16 is still another schematic diagram of a structure of a communication apparatus according to an embodiment of this application.

Optionally, an embodiment of this application further provides a communication apparatus applied to a first user plane network element. FIG. 16 is still another schematic diagram of a structure of a communication apparatus according to an embodiment of this application. As shown in FIG. 16, the communication apparatus includes a sending unit 1601 and a receiving unit 1602.

The sending unit 1601 is configured to send a first link detection request to a first terminal; and the receiving unit 1602 is configured to receive, from the first terminal, link quality information of a transmission path from a first user plane function to the first terminal.

In a possible design, the receiving unit 1602 is further configured to receive a second link detection request from a second user plane function; and the sending unit 1601 is further configured to send, to the second user plane function, the link quality information of the transmission path from the first user plane function to the first terminal and link quality information of a transmission path from the second user plane function to the first user plane function.

In a possible design, the sending unit 1601 is further configured to send a third link detection request to the second user plane function; the receiving unit 1602 is further configured to receive link quality information of a transmission path from the first user plane function to the second user plane function and link quality information of a transmission path from the second user plane function to a second terminal from the second user plane function; and the sending unit 1601 is further configured to send, to the first terminal, link quality information of a transmission path from the first terminal to the first user plane function, the link quality information of the transmission path from the first user plane function to the second user plane function, and the link quality information of the transmission path from the second user plane function to the second terminal.

Similarly, the second user plane function also has an apparatus similar to the first user plane function, and is configured to implement a function that can be implemented by the second user plane function in the foregoing embodiments, for example, sending the second link detection request to the first user plane function, sending, to the terminal, link quality information of a transmission path from the second terminal to the first terminal, receiving the third link detection request from the first user plane function, sending a fourth link detection request to the second terminal, sending the link quality information of the transmission path from the second user plane function to the second terminal and the like to the second user plane function. Specific implementation of the apparatus for the second user plane function is not described herein again by using the accompanying drawings.

Figure 17:
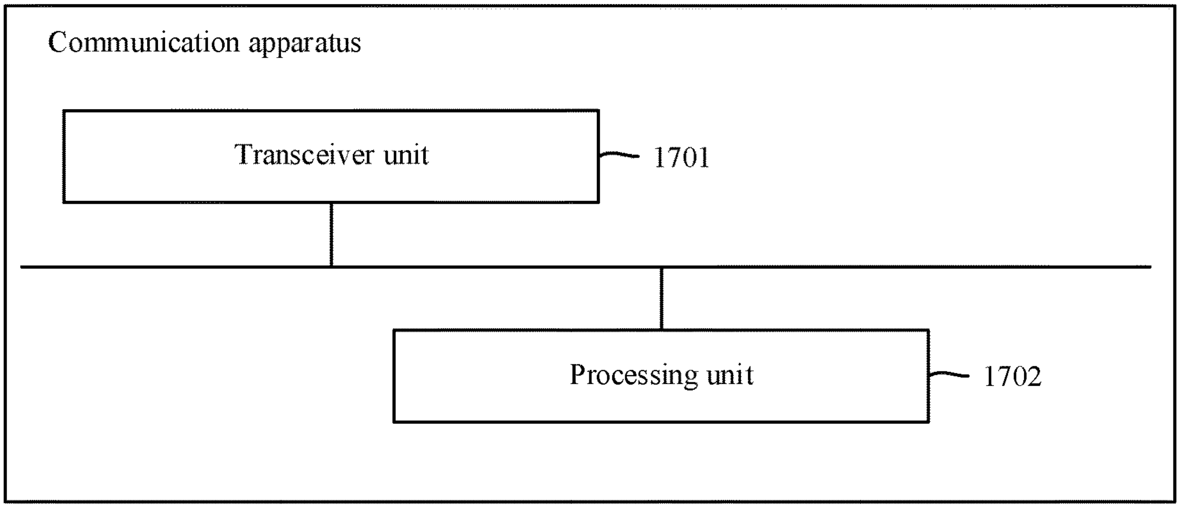
FIG. 17 is still another schematic diagram of a structure of a communication apparatus according to an embodiment of this application.

Optionally, an embodiment of this application further provides a communication apparatus. The communication apparatus may be applied to any one of the first user plane network element, the second user plane network element, the first terminal, and the second terminal. FIG. 17 is still another schematic diagram of a structure of a communication apparatus according to an embodiment of this application. As shown in FIG. 17, the communication apparatus may include a transceiver unit 1701 and a processing unit 1702.

The transceiver unit 1701 may be configured to send and receive information, or configured to communicate with another network element. The processing unit 1702 may be configured to process data.

When the communication apparatus is applied to the first user plane network element, the second user plane network element, the first terminal, or the second terminal, the transceiver unit 1701 and the processing unit 1702 may be configured to implement the method that is correspondingly performed by the first user plane network element, the second user plane network element, the first terminal, or the second terminal in the foregoing embodiments.

It should be understood that division of units in the apparatus is merely logical function division. During actual implementation, all or some of the units may be integrated into one physical entity or may be physically separated. In addition, all the units in the apparatus may be implemented in a form in which a processing element invokes software, or may be implemented in a form of hardware; or some units may be implemented in a form in which a processing element invokes software, and some units are implemented in a form of hardware.

For example, units may be separately disposed processing elements, or may be integrated into a chip of the apparatus for implementation. In addition, the units may be stored in a memory in a program form, and is invoked by a processing element of the apparatus to perform functions of the units. In addition, such units may be integrated together or may be individually implemented. The processing element herein may also be referred to as a processor, and may be an integrated circuit having a signal processing capability. During implementation, the steps in the foregoing methods or the foregoing units may be implemented by using a hardware integrated logic circuit in a processing element, or may be implemented in the form in which the processing element invokes software.

In an example, any one of the foregoing units in the apparatus may be one or more integrated circuits configured to implement the foregoing methods, for example, one or more ASICs, one or more DSPs, one or more FPGAs, or a combination of at least two of the integrated circuit forms.

For another example, when the unit in the apparatus may be implemented in a form of a program invoked by a processing element, the processing element may be a general-purpose processor, for example, a CPU or another processor that can invoke the program. For still another example, the units may be integrated and implemented in a form of a system-on-a-chip (SOC).

The foregoing unit for receiving is an interface circuit or an input circuit of the apparatus, and is configured to receive a signal from another apparatus. For example, when the apparatus is implemented by using a chip, the receiving unit is an interface circuit or an input circuit used by the chip to receive a signal from another chip or apparatus. When the communication apparatus includes a unit for sending, the unit for sending is an interface circuit or an output circuit of the apparatus, and is configured to send a signal to another apparatus. For example, when the apparatus is implemented by using a chip, the sending unit is an interface circuit or an output circuit used by the chip to send a signal to another chip or apparatus.

For example, an embodiment of this application may further provide a communication apparatus, which may be applied to any one of the first user plane network element, a second user plane network element, the first terminal, and the second terminal. The communication apparatus may include a processor and an interface circuit. There may be one or more processors.

When the communication apparatus is applied to the first user plane network element, the second user plane network element, the first terminal, or the second terminal, the processor is configured to: communicate with another apparatus by using the interface circuit, and perform the steps correspondingly performed by the first user plane network element, the second user plane network element, the first terminal, or the second terminal in the foregoing method.

In an implementation, units that are used by the first user plane network element, the second user plane network element, the first terminal, or the second terminal to implement corresponding steps in the foregoing methods may be implemented by using a processing element to schedule a program. For example, an apparatus used by the first user plane network element, the second user plane network element, the first terminal, or the second terminal may include a processing element and a storage element. The processing element invokes a program stored in the storage element, to perform the method performed by the first user plane network element, the second user plane network element, the first terminal, or the second terminal in the foregoing method embodiments. The storage element may be a storage element whose processing element is located on a same chip, that is, an on-chip storage element.

In another implementation, a program used to perform the method performed by the first user plane network element, the second user plane network element, the first terminal, or the second terminal in the foregoing method may be in a storage element, that is, an off-chip storage element, located on a chip different from that of the processing element. In this case, the processing element invokes or loads a program from the off-chip storage element to the on-chip storage element, to invoke and perform the method performed by the first user plane network element, the second user plane network element, the first terminal, or the second terminal in the foregoing method embodiments.

For example, an embodiment of this application may further provide a communication apparatus. The communication apparatus may include a processor, configured to execute computer instructions stored in a memory. When the computer instructions are executed, the apparatus is enabled to perform the method performed by the first user plane network element, the second user plane network element, the first terminal, or the second terminal. The memory may be located inside the communication apparatus, or may be located outside the communication apparatus. There are one or more processors.

In still another implementation, units for implementing the steps in the foregoing methods by the first user plane network element, the second user plane network element, the first terminal, or the second terminal may be configured as one or more processing elements. These processing elements may be disposed on the corresponding first user plane network element, second user plane network element, first terminal, or second terminal. The processing element herein may be an integrated circuit, for example: one or more ASICs, one or more DSPs, one or more FPGAs, or a combination of these quasi-integrated circuits. These integrated circuits may be integrated together to form a chip.

Units for implementing the steps in the foregoing methods by the first user plane network element, the second user plane network element, the first terminal, or the second terminal may be integrated together and implemented in a form of an SOC. The SOC chip is configured to implement a corresponding method. At least one processing element and storage element may be integrated into the chip, and the processing element invokes a program stored in the storage element to implement the corresponding method. Alternatively, at least one integrated circuit may be integrated into the chip, to implement the corresponding method. Alternatively, with reference to the foregoing implementations, functions of a part of units may be implemented by invoking a program by the processing element, and functions of a part of units may be implemented by the integrated circuit.

As described above, the processing element herein may be a general-purpose processor, for example, a CPU, or may be one or more integrated circuits configured to implement the foregoing methods, for example, one or more ASICs, one or more microprocessors DSPs, one or more FPGAs, or a combination of at least two of the integrated circuits.

The storage element may be one memory, or may be a general term of a plurality of storage elements.

For example, an embodiment of this application further provides a chip system. The chip system may be applied to any one of the first user plane network element, the second user plane network element, the first terminal, or the second terminal. The chip system includes one or more interface circuits and one or more processors. The interface circuit and the processor are interconnected by a line. The processor receives and executes computer instructions from a memory of an electronic device by using the interface circuit, to implement the method performed by the first user plane network element, the second user plane network element, the first terminal, or the second terminal in the foregoing method embodiments.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the several embodiments provided in this application, it should be understood that the disclosed apparatus and method may be implemented in other manners. For example, the described apparatus embodiment is merely an example. For example, the module or division into the units is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of embodiments.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of embodiments of this application essentially, or the part contributing to the conventional technology, or all or some of the technical solutions may be implemented in a form of a software product, for example, a program. The software product is stored in a program product, for example, a computer-readable storage medium, and includes several instructions for instructing a device (which may be a single-chip microcomputer, a chip, or the like) or a processor to perform all or some of the steps of the methods described in embodiments of this application. The foregoing storage medium includes any medium that can store program code, such as a USB flash drive, a removable hard disk, a ROM, a RAM, a magnetic disk, or an optical disc.

For example, an embodiment of this application may further provide a computer-readable storage medium, including computer software instructions. When the computer software instructions are run on a core network device or are built in a chip of the core network device, the core network device may be enabled to perform the method performed by the first user plane network element or the second user plane network element in the foregoing embodiments.

Alternatively, when the computer software instructions are run on a terminal or a chip built in the terminal, the terminal is enabled to perform the method performed by the first terminal or the second terminal in the foregoing embodiments.

The foregoing descriptions are merely specific implementations of this application, but are not intended to limit the protection scope of this application. Any variation or replacement within the technical scope disclosed in this application shall fall within the protection scope of this application. Therefore, the protection scope of this application shall be subject to the protection scope of the claims.

What is claimed is:

1. A method, comprising:

sending, by a first user plane function to a first terminal, a first link detection request;

receiving, by the first user plane function from the first terminal, first link quality information of a first transmission path from the first user plane function to the first terminal;

receiving, by the first user plane function from the first terminal, data, wherein the data is sent to a second terminal; and sending, by the first user plane function, the data to a second user plane function through a first quality of service (QoS) flow between the first user plane function and the second user plane function, the second user plane function corresponding to the second terminal.

2. The method according to claim 1, wherein the data comprises a link detection indication, and the method further comprises:

inserting, by the first user plane function, second link quality information of a second transmission path from the first terminal to the first user plane function or third link quality information of a third transmission path from an access network device of the first terminal to the first user plane function into the data based on the link detection indication.

3. The method according to claim 1, wherein the method further comprises:

receiving, by the first user plane function from the second user plane function, a second link detection request; and sending, by the first user plane function to the second user plane function, the first link quality information of the first transmission path from the first user plane function to the first terminal and second link quality information of a second transmission path from the second user plane function to the first user plane function.

4. The method according to claim 1, wherein the method further comprises:

sending, by the first user plane function to the second user plane function, a third link detection request;

receiving, by the first user plane function from the second user plane function, third link quality information of a third transmission path from the first user plane function to the second user plane function and fourth link quality information of a fourth transmission path from the second user plane function to the second terminal; and sending, by the first user plane function to the first terminal, fifth link quality information of a fifth transmission path from the first terminal to the first user plane function, the third link quality information of the third transmission path from the first user plane function to the second user plane function, and the fourth link quality information of the fourth transmission path from the second user plane function to the second terminal.

5. The method according to claim 4, wherein the third link quality information of the third transmission path from the first user plane function to the second user plane function comprises a first timestamp at which the second user plane function receives the third link detection request and a second timestamp at which the second user plane function sends the third link quality information, and wherein the method further comprises:

determining, by the first user plane function, third link quality of the third transmission path from the first user plane function to the second user plane function based on the third link quality information of the third transmission path from the first user plane function to the second user plane function.

6. The method according to claim 1, wherein the receiving, by the first user plane function, the data from the first terminal comprises:

receiving, by the first user plane function from the first terminal, the data through a second QoS flow, and wherein the method further comprises:

determining, by the first user plane function based on a correspondence between the second QoS flow and the first QoS flow, the first QoS flow corresponding to the second QoS flow.

7. The method according to claim 6, wherein the method further comprises:

receiving, by the first user plane function from a first session management function, first configuration information, the first configuration information indicating the correspondence between the second QoS flow and the first QoS flow.

8. The method according to claim 7, wherein the first configuration information comprises second identifier information of the second QoS flow and first identifier information of the first QoS flow corresponding to the second QoS flow.

9. The method according to claim 8, wherein the first configuration information further comprises identifier information of a first interface between the first user plane function and the second user plane function, and the first configuration information indicates the first user plane function to send the data to the second user plane function on the first interface through the first QoS flow.

10. The method according to claim 8, wherein the second identifier information of the second QoS flow is the same as the first identifier information of the first Qos flow.

11. The method according to claim 1, wherein the method further comprises:

determining, by the first user plane function based on a correspondence between a data feature of the data and the first QoS flow, the first QoS flow corresponding to the data feature.

12. The method according to claim 11, wherein the method further comprises:

receiving, by the first user plane function from a first session management function, first configuration information, the first configuration information indicating the correspondence between the data feature and the first QoS flow.

13. The method according to claim 12, wherein the first configuration information indicates the data feature and first identifier information of the first QoS flow corresponding to the data feature.

14. A method, comprising:

sending, by a first terminal to a second terminal, a link detection indication and first link quality information of a first transmission path from the second terminal to the first terminal;

receiving, by the first terminal from a first user plane function, a first link detection request;

sending, by the first terminal to the first user plane function, second link quality information of a second transmission path from the first user plane function to the first terminal; and receiving, by the first terminal from the second terminal, third link quality information of a third transmission path from the first terminal to the second terminal.

15. The method according to claim 14, the link detection indication indicating to detect link quality information of a quality of service (QoS) flow that carries the link detection indication and that is in the second transmission path from the first terminal to the second terminal.

16. The method according to claim 14, wherein the link detection indication comprises identifier information of one or more QoS flows.

17. The method according to claim 16, wherein the identifier information of the one or more QoS flows comprises first identifier information of a first QoS flow between the first terminal and the first user plane function, second identifier information of a second QoS flow between the first user plane function and a second user plane function, and third identifier information of a third QoS flow between the second user plane function and the second terminal.

18. The method according to claim 14, wherein the method further comprises:

determining, by the first terminal based on the third link quality information of the third transmission path from the first terminal to the second terminal and a Qos requirement of data that needs to be sent to the second terminal, a QoS flow that carries the data.

19. An apparatus applied to a first terminal, the apparatus comprising:

at least one processor; and a non-transitory computer readable storage medium storing programming, the programming including instructions that, when executed by the at least one processor, cause the apparatus to perform operations including:

sending, to a second terminal, a link detection indication and first link quality information of a first transmission path from the second terminal to the first terminal;

receiving, from a first user plane function, a first link detection request;

sending, to the first user plane function, second link quality information of a second transmission path from the first user plane function to the first terminal; and receiving, from the second terminal, third link quality information of a third transmission path from the first terminal to the second terminal.

20. An apparatus applied to a first user plane function, the apparatus comprising:

at least one processor; and a non-transitory computer readable storage medium storing programming, the programming including instructions that, when executed by the at least one processor, cause the apparatus to perform operations including:

sending, to a first terminal, a first link detection request;

receiving, from the first terminal, first link quality information of a first transmission path from the first user plane function to the first terminal;

receiving, from the first terminal, data, wherein the data is sent to a second terminal; and sending the data to a second user plane function through a first quality of service (Qos) flow between the first user plane function and the second user plane function, the second user plane function corresponding to the second terminal.

* * * * *